United States Patent [19]

Okada et al.

[11] Patent Number: 4,981,896

[45] Date of Patent: Jan. 1, 1991

[54] THERMOPLASTIC RESIN COMPOSITION

[75] Inventors: Takayuki Okada, Niihama; Tatsuyuki Mitsuno; Takeshi Fujii, both of Chiba; Kentaro Yamaguchi, Ichihara; Mitsuyuki Okada, Ichihara; Mitsuji Tsuji, Ichihara; Takeyoshi Nishio, Okazaki; Toshio Yokoi; Takao Nomura, both of Toyota, all of Japan

[73] Assignees: Sumitomo Chemical Company, Osaka; Toyota Jidosha Kabushiki Kaisha, Toyota, both of Japan

[21] Appl. No.: 327,109

[22] Filed: Mar. 22, 1989

[30] Foreign Application Priority Data

Mar. 31, 1988 [JP] Japan .................................. 63-82041
Mar. 31, 1988 [JP] Japan .................................. 63-82042

[51] Int. Cl.$^5$ ....................... C08L 51/06; C08L 37/00
[52] U.S. Cl. ................................... 524/413; 524/426; 524/427; 524/449; 524/451; 524/504; 525/64; 525/166
[58] Field of Search ........................ 525/64, 166, 176; 524/504, 413, 426, 427, 449, 451

[56] References Cited

U.S. PATENT DOCUMENTS 4,172,859 10/1979 Epstein .
4,461,871 7/1984 Kometani ............................ 525/166
4,780,505 10/1988 Mashita et al. .

FOREIGN PATENT DOCUMENTS 0177151 4/1986 European Pat. Off. .............. 525/64
45-030944 10/1970 Japan .
45-030945 10/1970 Japan .
59-115352 7/1984 Japan .

*Primary Examiner*—Patricia Short
*Attorney, Agent, or Firm*—Stevens, Davis, Miller & Mosher

[57] ABSTRACT

There is disclosed a thermoplastic resin composition comprising a blend of 100 parts by weight of a resin composition composed of 1 to 99% by weight of a polypropylene type resin (C) selected from the group consisting of a modified polypropylene (A) obtained by graft copolymerizing an unsaturated carboxylic acid or a derivative thereof and an unsaturated aromatic monomer onto polypropylene, and a composition composed of the modified polypropylene (A) and a polypropylene (B), and 99 to 1% by weight of at least one saturated polyester resin (D), 0.1 to 300 parts by weight of an epoxy group containing copolymer (E), 0.1 to 300 parts by weight of a modified ethylenic copolymer rubber (F) obtained by graft copolymerizing an unsaturated carboxylic acid or a derivative thereof and an unsaturated aromatic monomer onto ethylenic copolymer rubber, and up to 5 parts by weight of a basic compound (G) optionally added as reaction accelerator, the content of the saturated polyester resin in the thermoplastic polyester resin being less than 50% by weight.

The thermoplastic resin composition of the present invention has high heat resistance and high impact resistance, in particular, high low-temperature impact resistance and is advantageously used in automobile parts, electric and electronic parts, etc.

19 Claims, 1 Drawing Sheet

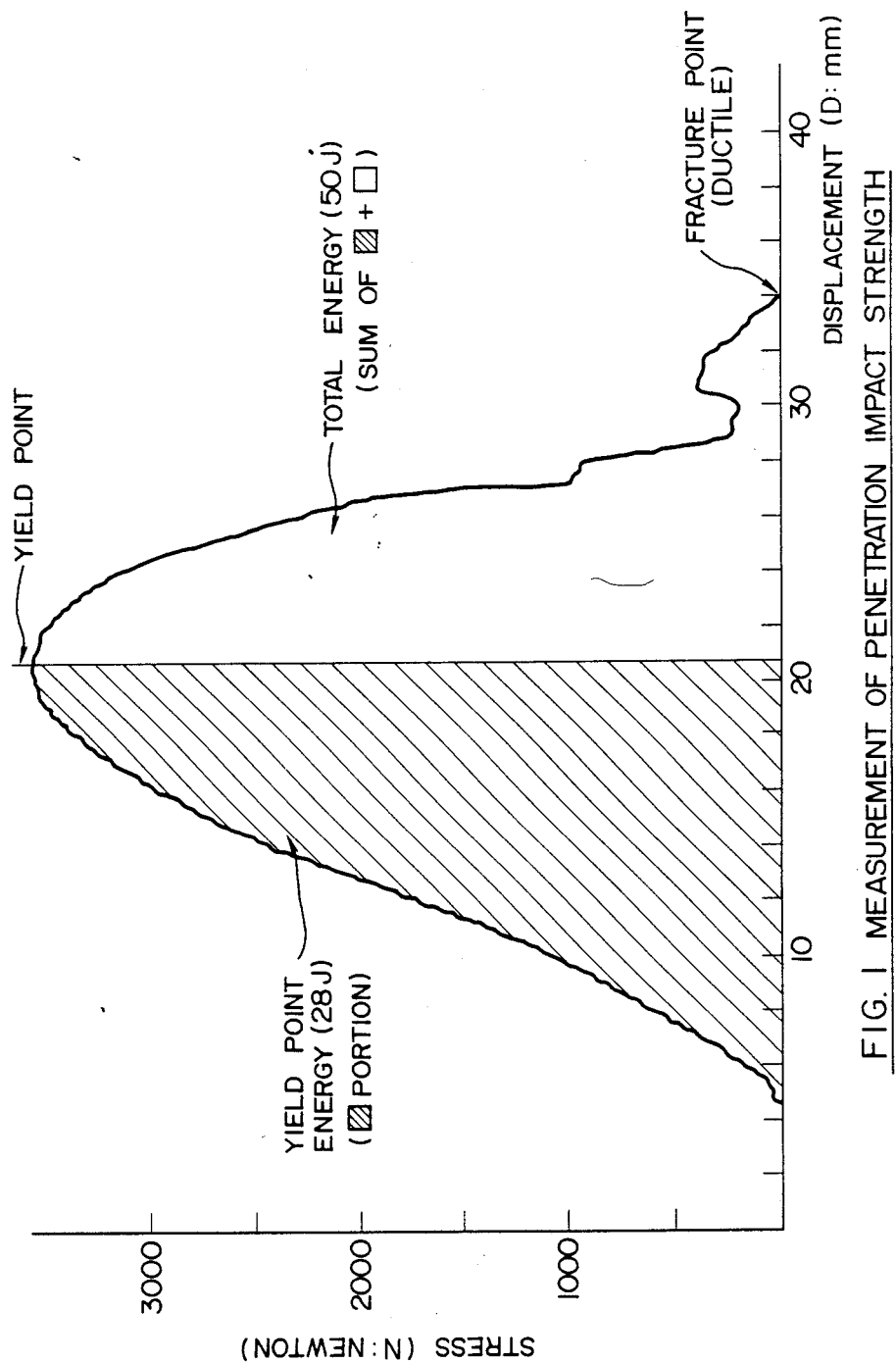

THERMOPLASTIC RESIN COMPOSITION

The present invention relates to a novel thermoplastic resin composition which can be utilized in the form of molded articles, sheets, films, etc. by means of injection molding, extrusion molding, etc.

More particularly, the present invention relates to a novel thermoplastic resin composition having excellent balance in physical properties and excellent appearance, which is obtained by blending a polypropylene resin and an saturated polyester resin with an epoxy group containing copolymer, a modified ethylenic copolymer rubber and a basic compound.

BRIEF DESCRIPTION OF THE DRAWINGS

FIG. 1 shows an example or measurement chart in evaluating the penetration impact strength. The axis of abscissa refers to the degree of deformation of a test piece and the axis of ordinate to stress corresponding to individual values of the degree of deformation. Said measurement chart is obtained by detecting the values of the degree of deformation and the stress continuously and plotting these values on a X-Y plotter continuously.

The yield point energy is determined by integrating the area with respect to the displacement and the stress from the rising of detected stress to the point of yield of a material. The total energy is determined by integrating the area with respect to the displacement and the stress from the rising of detected stress to fracture of the material.

The state of fracture of the material is judged to be ductile fracture or brittle fracture by observing an actual fractured test piece of the material.

Polypropylenes have heretofore been widely used in the form of molded articles, films, sheets, etc. because they are excellent in molding processability, toughness, water resistance, gasoline resistance, chemical resistance, etc., have a low specific gravity, and are not expensive.

They, however, are poor or should be improved in heat resistance, stiffness, impact resistance, scratch resistance, coating properties, adhesive properties, printability, etc., and this defect is an obstacle to opening-up of new avenues of practical use for them.

For improving the coating properties, adhesive properties, printability etc. among the above properties, a method has been devised which comprises subjecting a portion or the whole of a polypropylene to graft modification by the use of an unsaturated carboxylic acid or an anhydride thereof, as disclosed, for example, in JP-B-58-47418 or JP-A-58-49736. However, even the employment of the modified polypropylenes thus obtained does not improve physical properties such as impact resistance, heat resistance and stiffness virtually.

On the other hand, saturated polyester resins are widely used in the fields of automobile parts and electric and electronic parts, as engineering resins characteristic heat resistance, stiffness, penetration impact resistance, scratch resistance, oil resistance, electric properties, but it is desirable to further improve their molding processability, toughness, notched impact resistance, water resistance, chemical resistance, etc. In addition, they have essential disadvantages in that they have a higher specific gravity and are more expensive than polyolefins.

From such a viewpoint, when by blending a polypropylene type resin selected from modified polypropylenes or compositions composed of modified polypropylenes and polypropylenes with a saturated polyester resin, a thermoplastic resin having the characteristics of both the polypropylene resin and the saturated polyester resin can be obtained, its various new uses can be expected.

However, it has heretofore been considered that the compatibility and dispersability between polypropylene resins and saturated polyester resins are very low. In fact, mere mixing of the above two kinds of resins involves the following problems.

Barus effect of molten polymer is remarkable, so that stable taking-off of extruded strand is substantially impossible, resulting in a marked lowering of the molding workability.

There can be obtained only an injection-molded product which has an extreme nonuniformity, has an ugly appearance owing to formation of flow marks, and cannot be used in practice in automobile parts, electric and electronic parts, etc.

The mechanical properties, in particular, impact resistance, tensile elongation, etc., of a molded product made of a mixture of a polypropylene resin and a saturated polyester resin often have values lower than those usually expected from the additivity of the respective physical properties of the polypropylene resin and the saturated polyester resin.

Polypropylenes and saturated polyesters are naturally not compatible with each other, but according to the method disclosed in JP-A-61-60746, a polypropylene resin selected from modified polypropylenes or compositions composed of modified polypropylenes and polypropylenes and a saturated polyester resin can be made compatible with and dispersable in each other by blending an epoxy group containing copolymer with them. Thus, it is possible to produce a thermoplastic resin composition which has a good balance in physical properties such as molding processability, stiffness, heat resistance, impact resistance, scratch resistance, coating properties, oil resistance, chemical resistance, and water resistance, and is excellent in appearance uniforming and smoothness.

However, in the fields of automobile parts, electric and electronic parts, etc., there is a demand for higher heat resistance and higher impact resistance, in particular, higher low-temperature impact resistance. In order to further improve the heat resistance and impact resistance of the thermoplastic resin composition disclosed in JP-A-61-60746, the present inventors earnestly investigated and consequently accomplished the present invention.

The present invention relates to a thermoplastic resin composition comprising a blend of 100 parts by weight of a resin composition (hereinafter referred to as "the resin composition") composed of 1 to 99% by weight of a polypropylene type resin (C) selected from the group consisting of a modified polypropylene (A) obtained by graft copolymerizing an unsaturated carboxylic acid or a derivative thereof and an unsaturated aromatic monomer onto polypropylene, and a composition composed of a modified polypropylene (A) and a polypropylene (B) (hereinafter referred to as "the composition") and 99 to 1% by weight of at least one saturated polyester resin (D), 0.1 to 300 parts by weight of an epoxy group containing copolymer (E), 0.1 to 300 parts by weight of a modified ethylenic copolymer rubber (F) obtained by graft copolymerizing an unsaturated carboxylic acid or a derivative thereof and an unsaturated aromatic monomer onto ethylenic copolymer rubber, and up to 5 parts by weight of a basic compound (G) optionally added as a reaction accelerator, the content of the saturated polyester resin in the thermoplastic resin composition (hereinafter referred to as "the thermoplastic resin composition") being less than 50% by weight.

Furthermore, the present invention relates to a thermoplastic resin composition comprising a blend of the aforesaid thermoplastic resin composition and 0.01 to 300 parts by weight of a filler (H) per 100 parts by weight of the resin composition.

The polypropylene type resin (C) used in this invention is a resin selected from the group consisting of a modified polypropylene (A) and a composition composed of a modified polypropylene (A) and a polypropylene (B).

A detailed explanation of polypropylene are given below. In the present specification, the word "polypropylene" is used as a starting material for the modified polypropylene (A) in some cases and as the polypropylene (B) in other cases.

In this invention, the polypropylene is a crystalline one and includes, for example, propylene homopolymer; block copolymers obtained by polymerizing propylene at the first step and copolymerizing the resulting polypropylene with ethylene and at least one α-olefin such as propylene or butene-1 at the second step; and n and m copolymers obtained by copolymerizing propylene with an o-olefin such as ethylene or butene-1.

The homopolymers, block copolymers or random copolymers can be obtained, for example, by reacting the starting materials in the presence of a chemical complex of a titanium trichloride and an alkylalminum compound which is usually called Ziegler-Natta catalyst.

The polymerization can be carried out at 0° to 300° C. However, preferably, the polymerization temperature is carried out usually in the range of 0° to 100° C, for example, because above 100° C., highly stereoregular polymerization of an α-olefin such as propylene becomes difficult to yield a polymer having a high stereoregularity.

Although the polymerization pressure is not critical, it is preferably 3 to 100 atmospheres because such a pressure is industrial and economical.

The polymerization can be carried out by a continuous process or a batch process.

As a method for the polymerization, there can be employed slurry polymerization using an inert hydrocarbon solvent such as butane, pentane, hexane, heptane, or octane; solution polymerization in which the produced polymer is dissolved in the inert hydrocarbon solvent mentioned above; bulk polymerization in which a liquid monomer is polymerized without solvent; and gas phase polymerization in which a gaseous monomer is polymerized.

It is also possible to add a chain transfer agent such as hydrogen in order to control the molecular weight of polymer.

The polypropylene used in this invention can be produced using an isospecific Ziegler-Natta catalyst. The catalyst used herein is preferably one which has a high isospecificity.

Catalysts which can be suitably used are those containing titanium trichloride having a layer crystal structure or a solid complex of a magnesium compound and a titanium compound as the transition metal constituent and an organoaluminum compound as the typical metal constituent. The catalyst may further contain a well-known electron donative compound as the third component.

Titanium trichloride used can be prepared by reducing titanium tetrachloride with a reducing agent of wide variety. As the reducing agent, metals such as aluminum and titanium, hydrogen, organometal compounds, etc. are known. A typical example of titanium trichloride produced through metal reduction is titanium trichloride composition ($TiCl_3AA$) which is prepared by reducing titanium tetrachloride with metallic aluminum and then pulverizing the reduction product by means of a ball mill or a vibration mill. Owing to the above process, the $TiCl_3AA$ contains activated aluminum chlorides. For improving the isospecificity, polymerization activity and/or particle shape of the $TiCl_3AA$, a compound selected from the group consisting of ether, ketones, esters, aluminum chloride, titanium chloride, etc. may be added during the pulverization.

Titanium trichloride more preferable for the object of this invention is one which is obtained by reducing titanium tetrachloride with an organoaluminum compound, and subjecting the resulting titanium trichloride composition to catalytic reaction with an ether compound and an halogen compound successively or at the same time. As the ether compound, those having the formula $R^1$-O-$R^2$ (each of $R^1$ and $R^2$ is an alkyl group having 1 to 18 carbon atoms), in particular, di-n-butyl ether and di-t-amyl ether, are preferable. The halogen compound is preferably selected from the group consisting of halogens, in particular, iodine; halogen compounds, in particular, iodine trichloride; titanium halides, in particular, titanium tetrachloride; and halogenated hydrocarbons, in particular, carbon tetrachloride and 1,2-dichloroethane. As the organoaluminum compound, those represented by the formula $AlR^3nX_{3-n}$ ($R^3$ is a hydrocarbon group having 1 to 18 carbon atoms, X is a halogen selected from Cl, Br and I, and n is an integer satisfying the inequality $3 \geq n > 1$), in particular, diethylaluminum chloride and ethylaluminum sesquichloride, are preferable.

Processes for producing such titanium trichloride as mentioned above are disclosed in detail in JP-A-47-34470, JP-A-53-33289, JP-A-53-51285, JP-A-54-11986, JP-A-58-142903, JP-A-60-28405, JP-A-60-228504, JP-A-61-218606, etc.

When titanium trichloride having a layer crystal structure is used as the transition metal compound component, organoaluminum compounds represented by the formula $AlR^4{}_mX_{3-m}$ ($R^4$ is a hydrocarbon group having 1 to 18 carbon atoms, X is a halogen selected from Cl, Br and I, and m is a number in the range $3 \geq m > 0$) are preferable as the typical metal compound component. Organoaluminum compounds particularly preferable for the object of this invention are compounds in which $R^4$ is an ethyl or isobutyl group, and m is a number in the range $2.5 \geq m \geq 1.5$. Specific examples of such compounds are diethylaluminum chloride, diethylaluminum bromide, diethylaluminum iodide, and mixtures of these compounds and triethylaluminum or ethylaluminum dichloride. When the third component described later is co-used, organoaluminum compounds in which m is a number in the range $3 \geq m \geq 2.5$ or $1.5 \geq m > 0$ can be suitably used for the object of this invention.

The molar ratio of the organoaluminum compound to the titanium trichloride falls within a wide range of 1–1,000 : 1.

The catalyst comprising titanium trichloride and the organoaluminum compound may further contain the third component which is well known. Specific examples of the third component are ε-caprolactam; ester compounds such as methyl methacrylate, ethyl benzoate, and the like; phosphorus acid esters such as triphenyl phosphite, tributyl phosphite, and the like; and the phosphoric acid derivatives such as hexamethylphosphoric triamide, and the like.

Although the amount used of the third component should be experimentally determined for each component because the components exhibit different efficiencies, it is usually used in an amount equimolar with or smaller than the amount of the organoaluminum compound.

When a solid complex of a magnesium compound and a titanium compound is used as the transition metal solid component of the catalyst, organoaluminum compounds, in particular, compounds represented by the formula $AlR^5_p X_{3-p}$ ($R^5$ is a hydrocarbon group having 1 to 18 carbon atoms, X is a halogen selected from Cl, Br and I, and p is a number in the range $3 \geq p > 2$), are preferable as the typical metal component of the catalyst. Specific examples of such compounds are triethylaluminum, triisobutylaluminum, and mixtures of these compounds with diethylaluminum chloride or diisobutylaluminum chloride.

It is preferable that the catalyst further contains at least one electron-donating compound, in particular, an aromatic monocarboxylic acid ester and/or a silicon compound having $Si-OR^6$ linkage.

As the silicon compound having $Si-OR^6$ linkage ($R^6$ is a hydrocarbon group having 1 to 20 carbon atoms), preferably used are alkoxysilane compounds represented by the formula $R^7_a Si(OR^6)_{4-a}$ (each of $R^6$ and $R^7$ is a hydrocarbon group having 1 to 20 carbon atoms, and a is a number of $0 \leq a \leq 3$). Specific examples of the alkoxysilane compounds are tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldiethoxysilane, etc.

The electron-donating compound is used preferably in an amount of 1 mole or less, particularly 0.05 to 1 mole per mole of the organoaluminum compound.

As the solid complex of a magnesium compound and a titanium compound, there is used titanium trichloride containing magnesium chlorides which is obtained by reducing titanium tetrachloride with an organomagnesium compound, or one of the so-called "supported catalyst" prepared by subjecting a solid magnesium compound to catalytic reaction with a liquid titanium compound. Preferably, the solid magnesium compound is a compound containing at least one electrondonating compound, in particular, an aromatic monocarboxylic acid ester, an aromatic dicarboxylic acid diester, an ether compound, an alcohol and/or a phenol. The aromatic monocarboxylic acid ester can be added during the catalytic reaction with a titanium compound.

Such solid complexes of a magnesium compound and a titanium compound are described in many official patent gazettes. Catalysts suitable for the object of this invention are described in detail, for example, in JP-A-54-112988, JP-A-54-119586, JP-A-56-30407, JP-A-57-59909, JP-A-57-59910, JP-A-57-59911, JP-A-57-59912, JP-A-57-59914, JP-A-57-59915, JP-A-57-59916, JP-A-54-112982, JP-A-55-133408, JP-A-58-27704, etc.

When the thermoplastic resin composition of the present invention encounters such requirements as particularly high heat resistance, stiffness, scratch resistance, etc., it is preferable to use a highly crystalline polypropylene having the following properties: an isotactic pentad of boiling heptane insoluble of propylene homopolymer portion of 0.970 or more, wherein the propylene homopolymer portion refers to the homopolymer portion of polypropylene or the homopolymer portion of propylene block copolymer which has been prepared as the first segment in the first step of the block polymerization process; a boiling heptane soluble of not more than 5.0% by weight; a 20° C xylene soluble of not more than 2.0% by weight.

The isotactic pentad of boiling heptane insoluble, boiling heptane soluble and 20° C xylene soluble are determined as follows.

In 500 ml of boiling xylene is completely dissolved 5 g of polypropylene, and the resulting mixture is cooled to 20° C and allowed to stand for 4 hours. Then, the mixture is filtered to remove the 20° C xylene insoluble. The filtrate is concentrated to dryness to evaporate xylene, and the residue is further dried under reduced pressure at 60° C. to obtain a solidified 20° C. xylene soluble. The 20° C. xylene soluble is determined by dividing the dry weight of the solidified 20° C. xylene soluble by the weight of the sample used and it is represented by percent. The above 20° C. xylene insoluble is dried and then extracted with boiling n-heptane in a Soxhlet apparatus for 8 hours. The extraction residue is referred to as boiling heptane insoluble. The boiling heptane soluble is determined by substracting the dry weight of the boiling heptane insoluble from the weight of the sample used (5 g) and dividing the remainder by the weight of the sample used. It is also represented by percent.

Isotactic pentad refers to the fraction of a series of five successive isotactically-sequenced propylene monomer units in the total polymer chain. It is determined based on $^{3}C$-NMR measurements as disclosed in A. Zambelli et al., Macromolecules, 6, 925 (1973). And the NMR absorption peaks are assigned based on the subsequently published Macromolecules, 8, 687 (1975).

Specifically, the isotactic pentad is determined based on the relative ratio of the area of mmmm peaks to the total area of the absorption peaks assigned to methyl carbons. Applying the method to the NPL standard substance CRM No. M19-14 Polypropylene PP/MWD/2 provided by the National Physical Laboratory (United Kingdom) gave an isotactic pentad of 0.944.

The above-mentioned highly crystalline polypropylene can be prepared by any of the methods disclosed in JP-A-60-28405, JP-A-60-228504, JP-A-61-218606, JP-A-61-287917, etc.

When the thermoplastic resin composition of the present invention is used for a purpose wherein an impact resistance is required, it is preferable to use a propylene block copolymer, which contains propylene homopolymer portions prepared in the first step as the first segment and block copolymer portions of propylene and an α-olefin such as ethylene and butene-1 prepared in the second step of the block polymerization process as the second segment.

The propylene block copolymer can be prepared by slurry polymerization or gas phase polymerization.

When said thermoplastic resin composition is used for a purpose wherein a particularly high impact resistance is required, the amount of the second segment should be increased. In this case, the propylene block copolymer is prepared preferably by gas phase polymerization.

Such a polypropylene having a high impact resistance can be prepared, for example, by the gas phase polymerization disclosed in JP-A-61-287917

In the propylene block copolymer, the propylene homopolymer portion prepared in the first step of the polymerization may consist of propylene monomer units alone or may consist of propylene monomer units and α-olefin monomer units such as ethylene or an α-olefin having 4 to 6 carbon atoms, wherein the content of the α-olefin monomer units is 6 mole% or less based on the total moles of the monomer units in the polymer produced in the first step. The copolymer portion prepared as the second segment in the second step of the polymerization preferably consists of ethylene monomer units only or consists of propylene monomer units and ethylene monomer units wherein the content of the ethylene monomer units is 10 mole% or more based on the total moles of the monomer units in the polymer produced in the second step or consists of monomer units of propylene, ethylene and an α-olefin having 4 to 6 carbon atoms. The propylene block copolymer contained the polymer produced in the second step, in an amount of 10 to 70% by weight based on the weight of the propylene block copolymer.

The content of the second segment for easy and stable production ranges from 10 to 30% by weight for slurry polymerization and from 10 to 70% by weight for gas phase polymerization.

In gas phase polymerization, propylene block copolymers containing a large amount of the second segment can be prepared according to the process disclosed in Japanese patent application No. 62-256015. Such copolymers are suited for the use wherein an extremely high impact resistance is requested.

Although the intrinsic viscosity of the second segment in tetraline at 135° C. should be changed depending on the production efficiency, physical properties of the product powder, and the intrinsic viscosity of the first segment, it is approximately 3-8 dl/g for slurry polymerization and 1-5 dl/g for gas phase polymerization.

In the present invention, the modified polypropylene (A) can be obtained, for example, by graft copolymerizing graft monomers such as an unsaturated carboxylic acid or a derivative thereof and an unsaturated aromatic monomer onto polypropylene, if necessary, in the presence of a free-radical initiator.

This graft modification of a polypropylene in the presence of an unsaturated aromatic monomer yields a modified polypropylene (A) which has a large amount of the unsaturated carboxylic acid or derivative thereof grafted, a melt flow rate after the graft modification slightly changed from that before the graft modification, and excellent physical properties.

For grafting the graft monomers on a polypropylene, various conventional methods can be employed.

There can be employed, for example, a method comprising mixing polypropylene, graft monomers and a radical generating agent followed by melt-kneading the resulting mixture in a melt-kneading apparatus to graft the graft monomers; a method comprising dissolving polypropylene in an organic solvent such as xylene, adding thereto a radical generating agent under nitrogen, carrying out the reaction with heating and stirring, thereafter cooling the reaction mixture, followed by washing filtration, and drying, and thereby obtaining a graft polypropylene; a method comprising irradiating the polypropylene with ultraviolet light or radiation in the presence of graft monomers; and a method comprising bringing polypropylene into contact with oxygen or ozone in the presence of graft monomers.

In consideration of economical efficiency and the like, it is most preferable to employ a method comprising melt-kneading in a melt-kneading apparatus and thereby carrying out graft copolymerization.

A polypropylene can be melt-kneaded with an unsaturated carboxylic acid or a derivative thereof, an unsaturated aromatic monomer and if necessary, a free-radical initiator at a temperature of 150° to 300° C., preferably 190° to 280° C. for a residence time of 0.3 to 10 minutes, preferably 0.5 to 5 minutes by means of an extruder, Banbury mixer, kneader, etc. It is industrially advantageous to employ a method in which a modified polypropylene is continuously produced by a single- or twin screw extruder while keeping the vent holes vacuous and while removing unreacted components (unsaturated carboxylic acid or derivative thereof, unsaturated aromatic monomer, free-radical initiator, etc.), by-products such as oligomers and decomposition products of these components. Although the reaction may be carried out in air, it is preferably carried out in an inert gas such as nitrogen or carbon dioxide. It is also possible to subject the modified polypropylene obtained to heat treatment at a temperature of 60° C. or higher, solvent extraction, and drawing a vacuum with melting.

If necessary, to the modified polypropylene (A) can be added antioxidants, heat stabilizers, light stabilizers, nucleating agents, lubricants, antistatic agents, inorganic or organic colorants, rust preventives, crosslinking agents, foaming agents, plastisizers, fluorescent agents, surface treating agents, surface brighteners, etc. during the modification or the after-treatment.

The unsaturated carboxylic acid used in the modified polypropylene (A) include, for example, acrylic acid, methacrylic acid, maleic acid, itaconic acid, citraconic acid, bicyclo[2,2,1]hepta-5-ene-2,3-dicarboxylic acid (himic acid), bicyclo[2,2,2]octa-5-en-2,3-dicarboxylic acid, 4-methylcyclohexa-4-en-1,2-dicarboxylic acid, 1,2,3,4,5,8,9,10-octahydronaphthalen2,3-dicarboxylic acid, bicyclo[2,2,1]octa-7-en-2,3,5,6-tetracarboxylic acid, 7-oxabicyclo[2,2,1]hepta-5-en-2,3-dicarboxylic acid and the like. The derivatives thereof are acid anhydride, esters, amides, imides and metal salts. Specific examples thereof are maleic anhydride, itaconic anhydride, citraconic anhydride, bicyclo[2,2,1]hepta-5-ene-2,3-dicarboxylic acid anhydride (himic acid anhydride: NBDA), monoethyl maleate, monomethyl fumarate, monomethyl itaconate, monomethyl fumarate, dimethylaminoethyl methacrylate, dimethylaminopropyl acrylamide, acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide, fumaric N,N-dibutylamide, maleimide, N-butyl maleimide, N-phenyl maleimide, sodium acrylate, sodium methacrylate, potassium acrylate, potassium methacrylate and the like.

Among then, maleic anhydride is most preferably used.

As the unsaturated aromatic monomer used in the modified polypropylene (A), styrene is most preferable. There can also be used o-methylstyrene, p-methylstyrene, m-methylstyrene, α-methylstyrene, vinyltoluene, divinylbenzene and mixtures thereof.

Although the modified polypropylene (A) can be produced in the absence of a free-radical initiator, it is usually preferably produced in the presence of a free-radical initiator. As the free-radical initiator, well-known ones can be used. The free-radical initiator includes, for example, azo compounds such as 2,2'-azobisisobutyronitrile, 2,2'-azobis(2,4,4-trimethylvaleronitrile) etc.; organic peroxides such as methyl ethyl ketone peroxide, cyclohexanone peroxide, 3,5,5-trimethylcyclohexanone peroxide, 2,2-bis(t-butylperoxy)bitane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butyl-peroxy)hexyne-3, lauroyl peroxide, 3,3,5-trimethylhexanoyl peroxide, benzoyl peroxide, t-butyl peracetate, t-butylperoxyisobutyrate, t-butylperoxypivalate, t-butylperoxy-2-ethylhexanoate, t-butylperoxy3,5,5-trimethylhexanoate, t-butylperoxylaurate, t-butylperoxybenzoate, di-t-butyldiperoxyisophthalate, 2,5-dimethyl-2,5-di(benzoylperoxy)hexane, t-butylperoxymaleic acid, t-butylperoxyisopropylcarbonate, polystyrene peroxide and the like.

In producing the modified polypropylene (A), the melt flow rate of a starting polypropylene (a crystalline propylene homopolymer, a crystalline propylene-ethyl-/α-olefin block copolymer, a crytstalline propylene-α-olefin random copolymer, or the like) is 0.05–60 g/10 min, preferably 0.1 to 40 g/10 min. The starting polypropyene is preferably chosen so as to adjust the melt flow rate of the resulting modified polypropylene (A) to 0.1–100 g/10 min, preferably 0.5 –50 g/10 min. The number average molecular weight of the starting polypropylene is 7,000 to 800,000, preferably 10,000 to 700,000.

In producing the modified polypropylene (A) resin, the blending amounts of the individual constituents are as follows. The amount of the unsaturated carboxylic acid or derivative thereof is preferably 0.01 to 10 parts by weight, more preferably 0.1 to 5 parts by weight per 100 parts by weight of the polypropylene. The amount of the unsaturated aromatic monomer is preferably 0.01 to 10 parts by weight, more preferably 0.1 to 5 parts by weight per 100 parts by weight of the polypropylene. The amount of the free-radical initiator is preferably 0 to 5 parts by weight, more preferably 0.001 to 2 parts by weight per 100 parts by weight of the polypropylene. When the amount of the unsaturated carboxylic acid or derivative thereof is less than 0.01 part by weight, the product has no markedly improved quality. When it exceeds 10 parts by weight, the improvement hits the ceiling and no more remarkable effect is brought about. Moreover, the unsaturated carboxylic acid or derivative thereof remains unreacted in a large amount in the resulting polymer and as a results, offensive smell, deterioration of physical properties, etc. occurs. Therefore, both of such amounts are not desirable for practical purposes. When the amount of the unsaturated aromatic monomer is less than 0.01 part by weight, no marked improving effect is brought about. On the other hand, when it exceeds 10 parts by weight, the improving effect of said monomer hits the ceiling. When the amount of the free-radical initiator exceeds 5 parts by weight, its effect on the graft reaction of the unsaturated carboxylic acid or derivative thereof hits the ceiling. Moreover, the decomposition of the polypropylene becomes so serious that the fluidity (melt flow rate) changes greatly. Therefore, such an amount is not desirable for practical purposes.

In this invention, the polypropylene type resin (C) selected from the group consisting of a modified polypropylene (A) and a composition composed of a modified polypropylene (A) and a polypropylene (B) is preferably one which has a melt flow rate of 0.1–100 g/10 min, particularly preferably 0.5–40 g/10 min.

The saturated polyester resin (D) in the present invention are obtained from dicarboxylic acid components at least 40 mole% of which is terephthalic acid, and diol components. Specific examples of dicarboxylic acid components, other than terephthalic acid, are aliphatic dicarboxylic acids having 2 to 20 carbon atoms, such as adipic acid, sebacic acid, dodecanedicarboxylic acid and the like; aromatic dicarboxylic acids such as isophthalic acid, naphthalenedicarboxylic acid and the like; alicyclic dicarboxylic acids such as cyclohexanddicarboxylic acid and the like; and each or mixtures of those acids. The diol components includes each or mixtures of aliphatic and alicyclic glycols, such as ethylene glycol, 1,3-propanediol, 1,4-butanediol, 1,6-hexanediol, 1,10-decanediol, 1,4-cyclohexanediol and the like.

Among such saturated polyester resins (D), polybutylene terephthalate or polyethylene terephthalate permits more desirable exhibition of the effects of the present invention. The intrinsic viscosity of the saturated polyester resin (D) is preferably in the range of 0.5–3.0 dl/g as measured at 25° C. using o-chlorophenol as a solvent. When a saturated polyester resin (D) having an intrinsic viscosity outside the above range, it tends to be difficult to attain a desired mechanical strength.

The epoxy group containing copolymer (E) in the present invention is a copolymer obtained from an unsaturated epoxy compound and an ethylenic unsaturated compound.

Although the proportions of these compounds for the epoxy group containing copolymer (E) is not critical, the proportion of the unsaturated epoxy compound is 0.1 to 50% by weight, preferably 1 to 30% by weight.

As the unsaturated epoxy compound, any compound may be used so long as it has in the molecule an unsaturated group which permits copolymerization with the ethylenic unsaturated compound and an epoxy group.

The unsaturated epoxy compound includes, for example, unsaturated glycidyl esters and unsaturated glycidyl ethers which are represented by the following formulas (1) and (2), respectively.

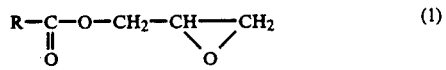

wherein R is a hydrocarbon group of 2–18 carbon atoms containing an ethylenic unsaturated bond.

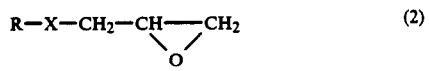

wherein R is a hydrocarbon group of 2–18 carbon atoms containing an ethylenic unsaturated bond, and X is

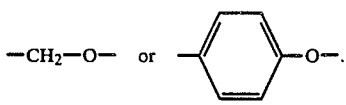

Specific examples of the unsaturated epoxy compound include glycidyl acrylate, glycidyl methacrylate, glycidyl itaconate, allyl glycidyl ether, 2-methyl allyl glycidyl ether, styrene p-glycidyl ether, etc.

The ethylenic unsaturated compound includes olefins, vinyl esters of saturated carboxylic acids of 2-6 carbon atoms, esters of saturated alcohols of 1-8 carbon atoms and acrylic acid, methacrylic acid, maleic acid or fumaric acid, vinylhalodes, styrenes, nitriles, vinyl ethers, acrylamides, etc.

Specific examples of the ethylenic unsaturated compound include ethylene, propylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutyl vinyl ether, acrylamide, etc. Among them, ethylene is particularly preferred.

For improving the impact resistance at low temperatures by lowering the glass transition temperature, it is preferable to use ethylene as second monomer and copolymerize a third commoner such as vinyl acetate and/or methyl acrylate.

The epoxy group containing copolymer can be produced by various methods. There can be employed either a random copolymerization method in which the unsaturated epoxy compound is introduced into the main chain of copolymer, or a graft copolymerization method in which the unsaturated epoxy compound is introduced as the side chain of copolymer. Specific examples of production process of the epoxy group containing copolymer include a process comprising copolymerizing the unsaturated epoxy compound with an ethylenic unsaturated compound in the presence of a radical-generating agent at 500 to 4,000 atmospheres and at 100° to 300° C. in the presence or absence of suitable solvent and chain transfer agent; a process comprising mixing a polypropylene with the unsaturated epoxy compound and a radical-generating agent, and subjecting the mixture to melt graft copolymerization in an extruder; and a process comprising copolymerizing the unsaturated epoxy compound with the ethylenic unsaturated compound in an inert medium such as water or organic solvent in the present of a radical-generating agent.

The modified ethylenic copolymer rubber (F) used in this invention for improving the impact resistance, in particular, the low-temperature impact resistance is obtained by graft copolymerizing an unsaturated carboxylic acid or a derivative thereof and an unsaturated aromatic monomer onto an ethylenic copolymer rubber if necessary, in the presence of a free-radical initiator. This graft modification in the presence of the unsaturated aromatic monomer yields a modified ethylenic copolymer rubber (F) which has a large amount of the unsaturated carboxylic acid or derivative thereof grafted, a small amount of gel formed in the graft copolymer, an excellent molding processability, and such an excellent storage stability that the Mooney viscosity does not increase during storage.

For grafting the graft monomers on the ethylenic copolymer rubber, various conventional methods can be employed.

There can be employed, for example, a method comprising mixing the ethylenic copolymer rubber, the graft monomers, and a free-radical initiator, and melt-kneading the mixture in a melt kneading apparatus to graft the graft monomers; a method comprising dissolving the ethylenic copolymer rubber in an organic solvent such as xylene, adding thereto a free-radical initiator under nitrogen, carrying out the reaction with heating and stirring, thereafter cooling the reaction mixture, followed by washing filtration, and drying, and thereby obtaining a grafted ethylenic copolymer rubber; a method comprising radiating the ethylenic copolymer rubber with ultraviolet light or radiation in the presence of the graft monomers; as method comprising bringing the ethylenic copolymer rubber into contact with oxygen or ozone in the presence of the graft monomers.

In consideration of economical efficiency and the like, the method comprising melt-kneading in a melt-kneading apparatus and thereby carrying out graft copolymerization is most preferably employed As the ethylenic copolymer rubber used in the modified ethylenic copolymer rubber (F), there can be used various ethylenic copolymer rubbers for example, ethylene-α-olefin copolymer rubbers or ethylene-α-olefin-nonconjugated diene copolymer rubbers typical example of which are ethylene-propylene copolymer rubbers (hereinafter abbreviated as "EPM") and ethylene-propylene-nonjugated diene copolymer rubbers (hereinafter abbreviated as "EPDM"), ethylene-vinyl acetate copolymers ethylene-methyl acrylate copolymers ethylene-methyl methacrylate copolymers, ethylene-ethyl acrylate copolymers, ethylene ethyl methacrylate copolymers, ethylene-butyl acrylate copolymers, ethylene-butyl methacrylate copolymers, ethylene-acrylic acid copolymer (r a partial metal salt thereof) ethylene-methacrylic acid (or a partial metal salt thereof) copolymers, ethylene-acrylic acid-acrylic ester copolymers, ethylene-methacrylic acid-acrylic ester copolymers, ethylene acrylic acid-methacrylic ester copolymers, ethylene-methacrylic acid methacrylic ester copolymers, ethylene-vinyl alcohol copolymers, ethylene-vinyl acetate-vinyl alcohol copolymers, ethylene-styrene copolymers, etc. These ethylenic copolymer rubbers can be used alone or as a mixture thereof. They can be used in admixture with low-density polyethylenes or high-density polyethylenes which have a good compatibility with the ethylenic copolymer rubbers.

Among these ethylenic copolymer rubbers, the ethylene-α-olefin copolymer rubbers and the ethylene-α-olefin-nonconjugated diene copolymer rubbers are particularly preferred. The ethylene-α-olefin copolymer rubbers include, for example, copolymers of ethylene and other α-olefin such as propylene, 1-butene, 1-pentene, 1-hexene, 4-methyl-1-pentene, 1-octene, etc., and terpolymer rubbers such as ethylene-propylene-1-butene copolymers etc. Among them, ethylene-propylene copolymer rubber and ethylene-1-butene copolymer rubber are preferably used.

Although the ethylene-α-olefin-nonconjugated diene copolymer rubbers can also be used, it is preferable to adjust the nonconjugated diene content of the starting rubber to 3% by weight or less. When the nonconjugated diene content exceeds 3% by weight, gelation occurs during kneading. Therefore, it is not desirable.

the ethylene content of the ethylene-α-olefin copolymer rubber is 15 to 85% by weight, preferably 40 5o 80% by weight. A highly crystalline copolymer having an ethylene content of more than 85% by weight is apt to become difficult to process under usual rubber molding conditions. On the other hand, an ethylene-α-olefin copolymer rubber having an ethylene content of less than 15% by weight is apt to lose its rubber properties because the glass transition temperature (Tg) increases.

The number average molecular weight of the ethylene-α-olefin copolymer rubber is preferably such that the rubber can be kneaded in an extruder, and it is usually 10,000 to 100,000. When the molecular weight is too low, handling of the rubber at the time of feeding to an extruder tends to be difficult. When the molecular weight is too high, processing of the rubber tends to be difficult because of a lowering of the fluidity.

The molecular weight distribution of the ethylene-α-olefin copolymer rubber is not critical, and there can usually be used any commercially available copolymer rubbers having various molecular weight distributions, for example, monomodal distribution and bimodal distribution.

The Q value (weight average molecular weight/number average molecular weight) of the molecular weight distribution is preferably in the range of 1 to 30, more preferably 2 to 20.

Said copolymer rubber is produced using one of the so-called Ziegler-Natta catalysts which are usually used production catalysts. As the Ziegler-Natta catalyst, there is used, for example, a combination of an organoaluminum compound and a trivalent to pentavalent vanadium compound soluble in hydrocarbon solvents. As the aluminum compound, there can be used alkylaluminum sesquichloride, trialkylaluminum, dialkylaluminum monochloride, and mixtures thereof. As the vanadium compound, there can be used, for example, vanadium oxytrichloride, vanadium tetrachloride, and vanadate compound represented by the formula $VO(OR^8)_q X_{3-q}$ ($0 < q \leq 3$, $R^8$ is a straight-chain, branched-chain, or cyclic hydrocarbon having 1 to 10 carbon atoms, and X is a halogen selected from Cl, Br and I).

In this invention, the modified ethylenic copolymer rubber (F) can be obtained by melt-kneading the ethylenic copolymer rubber with an unsaturated carboxylic acid or a derivative thereof, an unsaturated aromatic monomer and if necessary, a free-radical initiator at a temperature of usually 200° to 280° C., preferably 230° to 260° C. for a residence time of 0.2 to 10 minutes, which is varied depending on the kind of the free-radical initiator, by means of an extruder, Banbury mixer, kneader, or the like.

Since the presence of too large an amount of oxygen during the kneading results in formation of a gel or serious coloring in some cases, the kneading is preferably conducted in the substantial absence of oxygen.

When the kneading temperature is lower than 200° C., no desired amount of unsaturated dicarboxylic acid anhydride added can be attained, so that a small improving effect on the degree of graft reaction can be obtained in some cases. When the kneading temperature is higher than 280° C., only small improving effect on the degree of graft reaction is brought about and in some cases, formation of a gel, coloring etc. are liable to occur.

Although a kneading machine for the modification is not critical, an extruder is usually preferred because it permits continuous production. The extruder preferably have a single screw or twin screws which are suitable for uniformly mixing fed starting materials.

For removing unreacted constituents (unsaturated carboxylic acid or derivative thereof, unsaturated aromatic monomer, free-radical initiator, etc.), by-products such as their oligomers and decomposition products from the reaction products, the product can be purified by sucking through vent lines in the middle of the extruder or near its outlet by means of a vacuum pump, or by dissolution of the product in a suitable solvent, followed by decomposition. It is also possible to conduct heat treatment at a temperature of 60° C. or higher, or draw a vacuum with melting. Although the above four components, can be separately fed to a kneading machine, it is also possible to use a previously prepared uniform mixture of some or all of the four components. For example, there can be employed a method which comprises impregnating the rubber with the free-radical initiator and the unsaturated aromatic monomer, feeding the rubber, unsaturated carboxylic acid or derivative thereof and the like at the same time at the time of kneading, and kneading them. There can also be employed, for example, a method which comprises feeding the free-radical initiator and/or the unsaturated carboxylic acid or derivative thereof in the middle of the extruder, and thereby conducting modification.

If necessary, to the modified ethylenic copolymer rubber (F) can be added antioxidants, heat stabilizers, light stabilizers, nucleating agents, lubricants, antistatic agents, inorganic or organic colorants, rust preventives, crosslinking agents, foaming agents, plasticizers, fluorescent agents, surface treating agents, surface brighteners and the like during the modification or the after-treatment.

The unsaturated carboxylic acid or derivative thereof, the unsaturated aromatic monomer and the free-radical initiators which are used in the modified ethylenic copolymer rubber (F) can be selected from the compounds used for producing the modified polypropylene (A).

In producing the modified ethylenic copolymer rubber (F), the using amounts of the unsaturated aromatic monomer and the unsaturated carboxylic acid or derivative thereof are preferably 0.2 to 20 parts by weight and 0.5 to 15 pats by eight, respectively, per 100 parts by weight of the starting rubber, and the weight ratio of the unsaturated aromatic monomer to the unsaturated carboxylic acid or derivative thereof is preferably 0.1 to 3.0, more preferably 0.5 to 2.0.

When the weight ratio of the unsaturated aromatic monomer to the unsaturated carboxylic acid or derivative thereof is less than 0.1, there is brought about no desirable effect on prevention of gel formation and improvement of the degree of graft reaction in some cases. When the weight ratio exceeds 3.0, the effect of the unsaturated aromatic monomer hits the ceiling in some cases.

Although the using amount of the free-radical initiator depends on the kind thereof and the kneading conditions, the free-radical initiator can be used in an amount of usually 0.005 to 1.0 parts by weight, preferably 0.01 to 0.5 parts by weight, per 100 parts by weight of the starting rubber. When the using amount is less than 0.005 parts by weight, it is difficult to attain a desirable amount of the unsaturated carboxylic acid or derivative thereof added, and in some cases, one characteristic of the present invention, i.e., its effect of increasing the amount of the unsaturated carboxylic acid or derivative thereof added, by the couse of the unsaturated aromatic monomer is lessened. When the using amount exceeds 1.0 parts by weight, formation of a gel tends to occur.

The modified ethylenic copolymer rubber (F) thus obtained preferably has an amount of the unsaturated carboxylic acid or derivative thereof added of 0.1 to 5% by weight, an amount of the unsaturated aromatic monomer added of 0.1 to 5% by weight, and a Mooney viscosity ($ML_{1+4}$, 121° C.) of 5 to 120.

As one embodiment of the present invention, a polypropylene and an ethylenic copolymer rubber can be co-modified by adding an unsaturated carboxylic acid or a derivative thereof to them in the presence of an unsaturated aromatic monomer.

In detail, for producing the modified polypropylene (A) and the modified ethylenic copolymer rubber (F), the co-modification can be carried out by graft copolymerizing the unsaturated carboxylic acid or derivative thereof and the unsaturated aromatic monomer onto both the starting polypropylene and the starting ethylenic copolymer rubber, if necessary, in the presence of a free-radical initiator by the same method as used for producing the modified polypropylene (A) or the modified ethylenic copolymer rubber (F).

For placing the starting polypropylene and the starting ethylenic copolymer rubber together, there can be employed the following various conventional methods. When both starting materials are pellets, powder, or ground products, there can be employed, for example, a method comprising feeding the starting materials to a co-modifying apparatus such as an extruder separately or through the same feed opening, and thereby placing them together in the apparatus; and a method comprising premixing the starting materials uniformly by means of a simple mixer such as tumbler or Henschel mixer. When either of the starting materials is a large solid such as veil, there can be employed, for example, a conventional method comprising melt-kneading the starting materials by means of a batch melt-kneading apparatus such as roll mill, kneader or Banbury mixer to homogenize the same previously, and pelletizing or grinding the resulting mixture to facilitate feeding to a comodifying apparatus.

The stating polypropylene and the starting ethylenic copolymer rubber are not merely mixed. They can be co-modified by the same modification process as used for obtaining the modified polypropylene (A) or the modified ethylenic copolymer rubber (F).

Although in the co-modification, the blending proportions of the starting polypropylene and the starting ethylenic copolymer rubber can be properly chosen, they are preferably determined in consideration of the proportions of the modified polypropylene (A) and the modified ethylenic copolymer rubber (F) in the thermoplastic resin composition of the present invention.

In the co-modification, the amount of the unsaturated carboxylic acid or derivative thereof is preferably 0.01 to 20 parts by weight, more preferably 0.1 to 5 parts by weight, per 100 parts by weight of the sum of the starting polypropylene and the starting ethylenic copolymer rubber, the amount of the unsaturated aromatic monomer is preferably 0.01 to 15 parts by weight, more preferably 0.1 to 5 parts by weight per 100 parts by weight of the sum of the stating polypropylene and the starting ethylenic copolymer rubber, and the weight ratio of the unsaturated aromatic monomer to the unsaturated carboxylic acid or derivative thereof is preferably 0.1 to 3.0, more preferably 0.5 to 2.0. If necessary, a free-radical initiator can be used in an amount of preferably 0 to 5 parts by weight, more preferably 0.001 to 2 parts by weight.

For dispersing the starting polypropylene and the starting ethylenic copolymer rubber while comodifying them dynamically, it is preferable to use a high-kneading melt-kneading apparatus such as high-kneading kneading twin screw extruder.

In producing the thermoplastic resin composition of the present invention, a basic compound (G) can be added for accelerating the reaction of the graft copolymerized unsaturated carboxylic acid or derivative thereof in the modified polypropylene (A) and the modified ethylenic copolymer rubber (F) with the epoxy group in the epoxy group containing copolymer (E), and the reaction of the unreacted terminal carboxylic acid of the saturated polyester resin (D) with the epoxy group in the epoxy group containing copolymer (E).

The addition of the basic compound (G) permits reduction of the reaction time and hence the time required for the production.

As the basic compound (G), there are preferably used, for example, amine type organic compounds such as benzyldimethylamine, 2,4,6-tris(dimethylaminoethyl)phenol, etc.

In producing the thermoplastic resin composition, the reaction may be carried out by adding these basic compounds themselves, or the reaction may be carried out by adding them in the form of a master batch prepared by previously dispersing them to a high concentration in a portion of the resin constituents or a resin compatible with the thermoplastic resin composition in order to improve the dispersion.

In this invention, in producing the thermoplastic resin composition, a filler (H) can be blended for reinforcement, impartment of functions, extension (reduction of the cost), etc.

As the filler (H), there can be used fibers such as glass fiber, carbon fiber, polyamide fiber, metal fibers of aluminum, stainless steel and the like, metal whiskers, etc., inorganic fillers such as silica, alumina, calcium carbonate, talc, mica, clay, kaolin, carbon black, $TiO_2$, ZnO, $Sb_2O_3$, etc.

All of these fillers can be used for reinforcement. Fillers such a carbon fiber, metal fibers and carbon black can lower the surface resistivity and the volume resistivity and impart electrical conductivity to the thermoplastic resin composition of the present invention. The cost can be reduced by using a filler more inexpensive than the resins as an extender.

For improving stiffness and heat resistance of the thermoplastic resin composition of the present invention, it is particularly preferable to use as the filler (H), an inorganic filler such as glass fiber, potassium titanate whisker, talc, mica, calcium carbonate or the like.

One preferable embodiment of the present invention is to use the thermoplastic resin composition of the present invention in the form of composite materials obtained by further adding flame retardants or flame-retarding assistants, lubricants, nucleating agents, plasticizers, dyes, pigments, antistatic agents, antioxidants, weather resistance improvers, etc.

In the resin composition composed of a polypropylene type resin and a saturated polyester resin in the thermoplastic resin composition of the present invention, the polypropylene type resin (C) is contained in an amount of 1 to 99% by weight, preferably 15 to 98% by weight, based on the weight of the resin composition.

When the content of the polypropylene type resin (C) is less than 1% by weight, the molding processability, stiffness, water resistance., chemical resistance, and the like are not sufficient.

When a composition composed of a modified polypropylene and a polypropylene (B) is used as the polypropylene type resin (C), the modified polypropylene (A) is preferably contained in the composition in an amount of 5% by weight or more based on the weight of the composition. When the content is less than 5% by weight, the final resin composition is poor in compatibility and dispersibility, and sufficient toughness and impact resistance cannot be attained in some cases. Moreover, improvement of the coating properties, adhesive properties, printability and the like are not sufficient in some cases.

In the whole thermoplastic resin composition, the saturated polyester resin (D) is contained in an amount of less than 50% by weight, preferably 2 to 45% by weight, more preferably 5 to 40% by weight, based on the weight of the thermoplastic resin composition. The saturated polyester resin (D) has an improving effect on the heat resistance, stiffness, impact resistance and the like, but when its content exceeds 50% by weight, there cannot be attained desirable molding processability, stiffness, water resistance, chemical resistance and the like. Furthermore, the specific gravity is increased and the cost is raised.

In the present invention, the epoxy group containing copolymer (E) is blended in an amount of 0.1 to 300 parts by weight, preferably 1 to 200 parts by weight, more preferably 2 to 150 parts by weight, per 100 parts by weight of the resin composition composed of the polypropylene type resin (C) and the saturated polyester resin (D). When the blending amount is less than 0.1 parts by weight, the thermoplastic resin composition is poor in compatibility and dispersibility. Moreover, the stiffness and the impact resistance are not sufficient and the extrusion stability is low. When it is 100 parts by weight or more, the resulting thermoplastic resin composition is useful as a thermoplastic elastomer, but when the blending amount exceeds 300 parts by weight, the toughness, heat resistance and the like are greatly deteriorated and no desirable result can be obtained.

The modified ethylenic copolymer rubber (F) used in the thermoplastic resin composition of the present invention for the purpose of improving the impact resistance in particular, the low-temperature impact resistance is blended in an amount of 0.1 to 300 parts by weight, preferably 1 to 200 parts by weight, per 100 parts by weight of the resin composition composed of the polypropylene type resin (C) and the saturated polyester resin (D). When the blending amount is less than 0.1 part by weight, no impact resistance improving effect is brought about. When it is 100 parts by weight or more, the resulting thermoplastic resin composition is useful as an thermoplastic elastomer, but when it exceeds 300 parts by weight, the toughness, heat resistance and the like are seriously deteriorated and no desirable result can be obtained.

The amount of the basic compound (G) used as reaction accelerator in the thermoplastic resin composition of the present invention is 0 to 5 parts by weight, preferably 0.01 to 2 parts by weight, per 100 parts by weight of the resin composition composed of the polypropylene type resin (C) and the saturated polyester resin (D). When the intensity of kneading is sufficient and the residence time in a kneading machine is sufficient for the reaction, the basic compound (G) need not be blended. When the amount exceeds 5 parts by weight, a marked reaction accelerating effect is brought about, but the appearance and smell of molded article are very inferior because of bleeding and the like, and no desirable result can be obtained.

In the thermoplastic resin composition containing a filler of the present invention, the filler (H) used for reinforcement, impartment of functions, extension (reduction of the cost), etc. is blended in an amount of 0.01 to 300 parts by weight, preferably 1 to 200 parts by weight, per 100 parts by weight of the resin composition of the polypropylene type resin (C) and the saturated polyester resin (D). When the amount of the filler (H) is less than 0.01 part by weight, no filling effect can be obtained. When it exceeds 300 parts by weight, the toughness and the impact resistance are deteriorated and the intrinsic characteristics of the resins are lost, resulting in a brittle product. Thus, no desirable result can be obtained.

A method for producing the thermoplastic resin composition of the present invention is not critical, and conventional methods can be used.

Although a method comprising mixing the starting materials in solution followed by evaporation of the solvent or precipitation in a non-solvent is effective, a method comprising kneading the starting materials in molten state is employed in practice from an industrial viewpoint. For the melt-kneading, there can be used conventional kneading apparatus such as Banbury mixer, extruder, roll mill, various kneaders, etc.

In the kneading, it is preferable to mix the resin components all in the form of powder or pellets uniformly and previously in an apparatus such as tumbler or Henschel mixer. If necessary, it is also possible to omit the mixing and feed predetermined amounts of the resin components to a kneading apparatus individually.

When the basic compound (G) for accelerating the reaction is used in the form of powder or master batch, either of the methods described above can be employed. When the basic compound (G) is a liquid, it is preferable to mix the resin components previously in a tumbler or a Henschel mixer, but it is also possible to equip a kneading apparatus with a metering pump and add the liquid through a piping.

The kneaded resin composition is molded by various molding methods such as injection molding, extrusion molding, etc. The present invention also includes a method in which the starting materials are dry blended during injection molding or extrusion molding without a step of previous kneading, and kneaded directly during melt processing to obtain a molded product.

In the present invention, the order of kneading is not critical, and any of the following orders may be employed. (1) The modified polypropylene (A), the polypropylene (B), the saturated polyester (D), the epoxy group containing copolymer (E), the modified ethylenic copolymer rubber (F), the basic compound (G) and the filler (H) are kneaded in one lot. (2) The modified polypropylene (A) and the polypropylene (B) are previously kneaded to produce the polypropylene type resin (C), followed by kneading therewith the saturated polyester resin (D), the epoxy group containing copolymer (E), the modified ethylenic copolymer rubber (F), the basic compound (G), and the filler (H). (3) The polypropylene type resin (C) and the saturated polyester resin (D) are previously kneaded, followed by kneading therewith the epoxy group containing copolymer (E), the modified ethylenic copolymer rubber (F), the basic compound (G) and the filler (H). Other kneading orders may also be employed. However, when the modified polypropylene (A) and the epoxy group containing copolymer (E); the epoxy group containing copolymer (E) and the modified ethylenic copolymer rubber (F); or the saturated polyester resin (D) and the epoxy group containing copolymer (E), are previously blended, gelation occurs during the kneading in some cases, depending on the proportions of the two components of each combination. In this case it is necessary to choose the proportions of the two components properly and knead them previously.

In order to further simplify the kneading step, a step of previously producing the modified polypropylene (A) and the modified ethylenic copolymer rubber (F) can be incorporated into a kneading step for producing the thermoplastic resin composition of the present invention.

That is, the thermoplastic resin composition can be produced by co-modifying the starting polypropylene and the starting ethylenic copolymer rubber in the first stage, and adding the polypropylene (B), the saturated polyester resin (D), the epoxy group containing copolymer (E), the basic compound (G) and the filler (H) to the co-modified products in molten state.

For producing the thermoplastic resin composition of the present invention more effectively, it is preferable to use a high-kneading twin screw extruder having a long L/D ratio and two or more feed openings. That is, the thermoplastic resin composition can be efficiently produced by feeding the starting materials for co-modification through the first feed opening, comodifying them sufficiently before feeding the constituents other than the modified polypropylene (A) and the modified ethylenic copolymer (F), through the next feed opening, feeding the other constituents properly through the second and subsequent feed openings.

For desirable exhibition of physical properties of the thermoplastic resin composition of the present invention, various kneading methods, for example, the following methods can be employed. For satisfactory exhibition of the impact resistance, there can be employed a method comprising kneading a portion of the epoxy group containing copolymer (E) with the saturated polyester resin (D), followed by kneading therewith the other constituents. For more effective reinforcement with the filler (H) and satisfactory exhibition of the stiffness and the head resistance, there can be employed a method comprising kneading the filler (H) with one resin constituent which constitutes the filler-containing thermoplastic resin composition of the present invention and permits satisfactory dispersion therein of the filler (H), and then kneading therewith the other constituents; and a method comprising adding the filler (H) to the resin composition which has previously been melt-kneaded, in the middle of an extruder, and then kneading them. For efficient exhibition of the reaction-accelerating effect of the basic compound (G), there can be employed a method comprising preparing a master bath previously by dispersing the basic compound (G) in one resin constituent which constitutes the thermoplastic resin composition of the present invention, or in a resin compatible with said thermoplastic resin composition, to a high concentration, and then kneading the master batch with the other constituents.

The thermoplastic resin composition of the present invention can easily be molded by usual molding methods such as extrusion molding, compression molding, blow molding, roll molding, laminated molding, vacuum forming, pressure molding, etc. to give molded products. The present invention also includes a method in which the starting materials are dry blended during injection molding or extrusion molding without a step of previous kneading, and kneaded directly during melt processing to obtain a molded product.

Among the above molding methods, injection molding is preferred from the viewpoint of productivity and the like. Pellets of the thermoplastic resin composition are dried in a vacuum dryer, a hot-air dryer or the like and injection, olded under predetermined conditions including injection speed, injection time, cooling temperature, etc., to obtain a molded product.

Molded products obtained from the thermoplastic resin composition of the present invention can be used as automobile parts, electric and electronic parts, etc. Molded parts for automobile include exterior parts such as bumpers, benders, aprons, hood panels, fascia boards, rocker panels, rocker panel reinforces, floor panels, rear quarter panels, door panels, door supports, rooftop, trunk lid, etc., interior parts such as instrument panel, console box, glove compartment, shift knob, pillar garnishes, door trims, steering wheel, armrests, window lovers, carpets, headrests, seat belts, seats, etc., parts in engine room, such as distributer cap, air cleaner, radiator tank, battery case, radiator shroud, washer tank, cooling fan, heater case, etc., mirror body, wheel covers, trunk trims, trunk mat, gasoline tank, and the like.

The thermoplastic resin composition of the present invention can be advantageously used in, among the above molded product parts, bumpers and fenders which are required to have excellent stiffness and low-temperature penetration impact strength.

The following examples serve to give specific illustration of the practice of the present invention but they are not intended in any way to limit the scope of the present invention.

Methods for measuring the physical properties in the examples are described below.

(1) Specific gravity

Measured according to the method prescribed in JIS K6758.

(2) Melt flow rate

Measured according to the method prescribed in JIS K6758. The measuring temperature was 230° C. and the measurement was carried out under a load of 2.16 kg unless otherwise specified.

(3) Tensile test

Carried out according to the method prescribed in ASTM D638. The thickness of a test piece was 3.2 mm, and the tensile yield strength and the tensile elongation were evaluated. The measuring temperature was 23° C. unless otherwise specified.

(4) Flexural test

Carried out according to the method prescribed in JIS K7203. The thickness of a test piece was 3.2 mm, and the flexural modulus and the flexural strength were evaluated under conditions of a span length of 50 mm and a loading rate of 1.5 mm/min. The measuring temperature was 23° C. unless otherwise specified. When the measurement was carried out at temperature other than 23° C., the sample was subjected to the measurement after having been conditioned in a constant temperature bath at a predetermined temperature for 30 minutes.

(5) Izod impact strength

Measured according to the method prescribed in JIS K7110. The thickness of a test piece was 3.2 mm and the notched impact strength was evaluated. The measuring temperature was 23° C. unless otherwise specified. When the measurement was carried out at a temperature other than 23° C., the sample was subjected to the measurement after having been conditioned in a constant temperature bath at a predetermined temperature for 2 hours.

(6) Penetration impact strength

A high rate impact rester [Model RIT-800, mfd. by Rheometrics Inc. (USA)]was used. A flat test piece of 3 mm thickness was fixed by means of a 2-inch circular holder and a ⅝-inch (tip spherical surface: 5/16 inch R) impact probe was hit against the test piece. The degree of deformation of the test piece and the stress were measured by means of the tester, and the curve shown in FIG. 1 was drawn based on the measured values. The penetration impact strength was evaluated by integrating the area along the curve.

An energy value required for yield of the material and an energy value required for fracture of the material were evaluated in terms of energy at the yield point and the total energy, respectively. Both of them are expressed in joule (J).

The sample was conditioned in a constant temperature bath attached to the apparatus. The test piece was placed in a constant temperature bath previously adjusted to a predetermined temperature, conditioned for 2 hours, and then subjected to the above test. The predetermined temperature was employed as the measuring temperature.

(7) Thermal deformation temperature

Measure according to the method prescribed in JIS K7207. The fiber stress was measured at 4.6 kg/cm$^2$.

(8) Rockwell hardness

Measured according to the method prescribed in JIS K7207. The thickness of a test piece was 3.2 mm. As a steel ball, R was used. The evaluation value is expressed on R scale.

(9) Amounts of maleic anhydride and styrene added

The amount of maleic anhydride added in the modified polypropylene (A) was determined by dissolving a small amount of each sample in hot xylene, adding anhydrous acetone to cause precipitation, re-dissolving the thus purified sample in xylene, and titrating the resulting solution with a methanolic solution of NaOH with heating (110°-120° C.) by using phenolphthalein as an indicator.

The amount of styrene added in the modified polypropylene (A) was determined from the intensity of an absorption peak due to a substituted benzene ring which appeared in an infrared absorption spectrum measured for the aforesaid purified sample.

The amount of maleic anhydride added in the modified ethylenic copolymer rubber (F) was determined by dissolving a small amount of each sample in toluene, adding anhydrous acetone to cause precipitation, redissolving the thus purified sample in toluene, and titrating the resulting solution with a solution of KOH in ethanol with heating (85° C.) by using phenolphthalein as an indicator.

The amount of styrene added in the modified ethylenic copolymer rubber (F) was determined from the intensity of an absorption peak due to a substituted benzene ring which appeared in an infrared absorption spectrum measured for the aforesaid purified sample.

(10) Mooney viscosity

Measured according to the method prescribed in JIS K6300. The measuring temperature was 121° C.

(11) Number average molecular weight

Measured by a gel permeation chromatography (GPC) under the following conditions:

GPC: type 150C., mfd. by Waters
Column: Shodex 80MA mfd. by Showa Denko K.K
Amount of sample: 300 μl (polymer concentration 0.2 wt%)
Flow rate:1 ml/min
Temperature: 135° C.
Solvent: trichlorobenzene A calibration curve for calculating the number average molecular weight was prepared by a conventional method by using standard polystyrene mfd. by TOHSOH CORP. Data processing was conducted by means of a data processor CP-8 Model III mfd. by TOHSOH CORP.

(12) Ethylene content

Determined by the use of a calibration curve from the absorbances of characteristic absorptions due to methyl (-CH$_3$) and methylene (-CH$_2$—) which appeared in an infrared spectrum measured by using a pressed sheet previously prepared.

(13) Falling weight impact strength

Measured according to the method prescribed in JIS K7211. There was used a square test piece having a length of side of 10 cm which had been cut out of the hereinafter described molded product obtained by injection molding. The test piece was conditioned in at −30° C. for 2 hours and then subjected to the measurement.

(14) Pendulum test

Measured according to the method prescribed in FMVSS 581. The hereinafter described bumper obtained by injection molding was subjected to the impact test. The measuring temperature was −30° C. and the effective impact mass 100 kg.

(15) Initial degree of adhesion of coating layer

The surface of a test piece cut out of the hereinafter described molded product obtained by injection molding was washed with vaporized 1,1,1-trichloroethane (74° C.) for 30 seconds, dried at ordinary temperature, coated with RB 291H mfd. by Nippon Bee Chemical Co. as a primer, followed by baking in an over at 100° C. for 20 minutes. Subsequently, a urethane coating (Flexthane #101, mfd. by Nippon Bee Chemical Co.) was spray-coated on the test piece, followed by baking finish in an oven at 120° C. for 40 minutes. The coating film of the coated test piece was cut with a razor into 100 even squares (10×10) of 2 mm square. On the coating film, a pressure sensitive adhesive tape of 24 mm width (Cellotape ®mfd. by Nichiban Co., Ltd.) was pressed with a finger. Thereafter, the tape was peeled off at a breath with pinching the edge of the tape. The percentage of retention was determined by counting the remaining squares.

The above test pieces for determining the physical properties were prepared under the following injection molding conditions unless otherwise specified. The thermoplastic resin was dried in a hot-air dryer at 120° C. for 2 hours and then injection molded by means of a IS150E type injection molding machine mfd. by Toshiba Machine Co., Ltd. at a molding temperature of 240° C. and a mold-cooling temperature of 70° C. for 15 seconds for injection and 30 seconds for cooling.

The molded articles for evaluating the physical properties used in the test (13) to (15) were prepared under the following injection molding conditions. A bumper (weight 4500 g), a molded part for automobile, was obtained by drying the thermoplastic resin composition in a hot-air dryer at 120° c for 2 hours and then injection-molding the same by means of a UBE MAX2500 type injection molding machine mfd. by Ube Industries, Ltd. at a molding temperature of 240° C. and a mold-cooling temperature of 70° C. for 30 seconds for injection and 60 seconds for cooling.

A fender (weight 2000 g), a molded part for automobile, was obtained by injection molding the thermoplastic resin composition dried in the same manner as described above, by means of the same injection molding machine as described above, at a injection temperature of 240° C. and a mold-cooling temperature of 70° C. for 20 seconds for injection and 40 seconds for cooling.

The thermoplastic resin compositions described below were produced under the following conditions unless otherwise specified. Predetermined amounts of components were weighed individually, uniformly premixed in Henschel mixer, and then kneaded in a twin screw continuous kneading machine (Model TEX 44 SS 30BW-2V, mfd. by JAPAN STEEL WORKS LTD.) with suction through a vent at an extrusion rate of 30 kg/hour, a resin temperature of 240° C. and a screw revolution rate of 350 revolutions/min. The screws were composed of two sets of a triple-thread rotor and a triple thread kneading disc which sets were placed in two kneading zones, e.g., a zone next to the first feed opening and a zone next to the second feed opening, respectively.

Examples 1 to 7 (Tables 1-1 and 1-2)

A modified polypropylene (A) was produced in the following manner. A starting propylene homopolymer having a melt flow rate of 1.3 g/10 min, an intrinsic viscosity in tetralin at 135° C. of 2.45 dl/g, a 20° C. cold xylene soluble of 2.9% by weight, a boiling heptane soluble of 6.7% by weight, and an isotactic pentad of boiling heptane insoluble of 0.955 was modified as follows which had been produced by slurry polymerization by the process disclosed in JP-A-60-28405.

With 100 parts by weight of the starting propylene homopolymer were uniformly mixed by a Henschel mixer 1.0 part by weight of maleic anhydride, 0.5 part by weight of styrene, 0.6 part by weight of the propylene homopolymer containing as free-radical initiator 8% by weight of 1,3-bis(t-butylperoxyisopropyl)benzene (Sanperox ®-TY1.3, mfd. by Sanken Kako Co., Ltd) supported thereon, and 0.1 part by weight of Irganox ®1010 (mfd. by Ciba-Geigy Ltd.) as stabilizer. The resulting mixture was melt-kneaded by means of a TEX 44 SS-30BW-2V type twin screw extruder mfd. by JAPAN STEEL WORKS. LTD., at a temperature of 220° C. for an average residence time of 1.5 minutes to obtain a (maleic andridestyrene)-modified polypropylene (A) having an amount of maleic anhydride added of 0.15% by weight, an amount of styrene added of 0.07% by weight and a melt flow rate of 21 g/10 min. Said modified polypropylene (A) is hereinafter abbreviated as MS-PP-1.

A modified polypropylene having an amount of maleic anhydride added of 0.08% by weight and a melt flow rate of 36 g/10 min. was produced in exactly the same manner as described above except for omitting styrene. This modified polypropylene is hereinafter abbreviated as M-PP-1.

A polybutylene terephthalate (Toughpet PBT®N1000, mfd. by Mitsubishi Rayon Co., Ltd.) was used as a saturated polyester resin (D). This starting polybutylene terephthalate is hereinafter abbreviated as PBT-1.

An epoxy group containing copolymer (E) was produced in the following manner. A terpolymer of ethylene, vinyl acetate and glycidyl methacrylate in the ratio of 85:5:10 by weight having a melt flow rate of 7 g/10 min. (190° C., load 2.16 kg) was produced by high-pressure radical polymerization according to the process disclosed in JP-A-47-23490 and JP-A-48-11888. This epoxy group containing copolymer is hereinafter abbreviated as E.VA.GMA-1.

A modified ethylenic copolymer rubber (F) was produced in the following manner.

With 100 parts by weight of pellets of ethylene-propylene copolymer rubber having a number average molecular weight of 60,000 and an ethylene content of 78% by weight were mixed in a Henschel mixer 2.0 parts by weight of maleic anhydride, 2.0 parts by weight of styrene and 1.0 part by weight of the propylene homopolymer containing as free-radical initiator 8% by weight of 1,3-bis(t-butylperoxyisopropyl)benzene (Sanperox®-TY1.3, mfd. by Sanken Kako co., Ltd.) supported thereon. Subsequently, the resulting mixture was melt-kneaded under nitrogen by means of a TEX 44 SS-30BW-2V type twin screw extruder mfd. by JAPAN STEEL WORKS, LTD., at a kneading temperature of 250° C. and an extrusion rate of 18 kg/hour to obtain a modified ethylene-propylene copolymer rubber having an amount of maleic anhydride added of 1.5% by weight, an amount of styrene added of 0.8% by weight and a Mooney viscosity ($ML_{1+4}$, 121° C.) of 70. Said modified ethylene-propylene copolymer rubber is hereinafter abbreviated as MS-EPM-1.

The above starting materials were blended. As shown in Table 1-1, the blending proportions of MS-EPM-1 and E.VA.GMA-1 were unvaried, while those of MS-PP-1 or M-PP-1 and PBT-1 were various. Each blend was kneaded under the predetermined conditions to obtain a thermoplastic resin composition. Test pieces were made of the thermoplastic resin composition under the predetermined injection molding conditions and subjected to evaluation of the physical properties. The blending proportions are expressed in % by weight. The results of evaluation of the physical properties are shown in Table 1-2.

One example of measurement of the penetration impact strength at 23° C. for Example 3 is shown in FIG. 1. Although Izod impact strength is generally employed for impact resistance evaluation, penetration impact strength is often high even when Izod impact strength is low. Polybutylene terephthalates have a much higher surface impact strength than do propylene-ethylene.-propylene block copolymer though they have a lower notched Izod impact strength at −30° C. than do the latter Low-temperature falling ball test is employed for actual service evaluation of automobile parts, and the actual service evaluation by this test gives results which are well consistent with those obtained by a laboratory evaluation of the penetration impact strength.

In evaluation of the penetration impact strength, the higher the energy at yield point shown in FIG. 1 and the total energy, the higher the rating. The energy at yield point and the total energy can be calculated from the measurement chart. In addition, the state of fracture of a test piece at fracture point is important for associating the evaluation of the penetration impact strength with the actual service evaluation.

The state of fracture cannot be determined from the measurement chart and is judged by observing the state of fracture of a test piece after breakage. A state of fracture in which a sharp crack is formed or the test piece is divided into several pieces is referred to as "brittle fracture". The state of fracture in which the test piece is fractured in accordance with the shape of an impact probe without formation of a sharp crack or division into several pieces is referred to as "ductile fracture". The ductile fracture is preferable to the brittle fracture.

It can be seen that in Examples 1 to 5 of the present invention, the Izod impact strength and the penetration impact strength were greatly improved as compared with Examples 6 and 7 in which no modified ethylene-propylene copolymer rubber was blended.

Examples 8 to 11 (Tables 2-1 and 2-2)

The same starting materials as used in Examples 1 to 5 were blended. As shown in Table 2-1, the blending proportions of PBT-1 and E.VA.GMA-1 were unvaried, while those of MS-PP-1 and MS-EPM-1 were various. Using the blends thus obtained, thermoplastic resin compositions were produced in the same manner as in Examples 1 to 5, and their physical properties were evaluated. The results of the evaluation are shown in Table 2-2.

The higher the blending proportion of the modified ethylene-propylene copolymer rubber MS-EPM-1, the higher the Izod impact strength and the surface penetration strength. By contrast, the higher said blending proportion, the lower the thermal deformation temperature and hence the heat resistance.

Examples 12 to 15 (Tables 3-1 and 3-2)

The same starting material as used in Examples 1 to 5 were blended. As shown in Table 3-1, the blending proportions of MS-PP-1 and PBT-1 were unvaried, while those of MS-EPM-1 and E.VA.GMA-1 were various. Using the blends thus obtained, thermoplastic resin compositions were produced in the same manner as in Example 1 to 5, and their physical properties were evaluated. The results of the evaluation are shown in Table 3-2. It can be seen that in Examples 12 to 14 of the present invention, the Izod impact strength and the surfacer penetration strength were markedly improved as compared with Example 15 in which the epoxy group containing copolymer E.VA.GMA was not blended.

Example 16 (Table 4-1 and 4-2)

The same starting materials as used in Examples 1 to 5 and a basic compound (G) benzyldimethylamine (Sumicure BD ®, mfd. by Sumitomo Chemical Co.) as reaction accelerator were blended in the proportions shown in Table 4-1. Using the blend, a thermoplastic resin composition was produced in the same manner as in Examples 1 to 5, and its physical properties were evaluated. The results of the evaluation are shown in Table 4-2.

Although satisfactory physical properties were attained in Example 3 of the present invention in which no basic compound (G) was blended, the Izod impact strength and the surface penetration strength are further improved in Example 16 in which the basic compound (G) was blended.

Example 17 (Tables 5-1 and 5-2)

A modified polypropylene (A) was produced in the following manner.

By the same method as that used for producing MS-PP-1 in Examples 1 to 5, there was modified a starting highly crystalline propylene homopolymer having an intrinsic viscosity in tetralin at 135° C. of 2.42 dl/g, a melt flow rate of 1.6 g/10 min, a 20° C. cold xylene soluble of 0.6% by weight, a boiling heptane soluble of 2.9% by weight and an isotactic pendad of boiling heptane insoluble of 0.980 which had been produced by the slurry polymerization process disclosed in JP-A-60-228504. Thus, there was obtained a (maleic anhydride-styrene)-modified highly crystalline polypropylene having an amount of maleic anhydride added of 0.15% by weight, an amount of styrene added of 0.07% by weight, and a melt flow rate of 21 g/10 min. This modified highly crystalline polypropylene is hereinafter abbreviated as MS-PP-2.

The same starting materials as in Examples 1 to 5 were blended in the proportions shown in Table 5, except that MS-PP-2 was used as modified polypropylene. Using the resulting blend, a thermoplastic resin composition was produced in the same manner as in Examples 1 to 5, and its physical properties were evaluated. The evaluation results are shown in Table 5-2.

Although satisfactory physical properties were attained in Example 3 of the present invention in which the usual modified polypropylene MS-PP-1 was used, it can be seen that the employment of the modified highly crystalline polypropylene MS-PP-2 results in an increase of the flexural modulus and a rise of the thermal deformation temperature and hence brings about desirable effects on the stiffness and the heat resistance.

Example 18 (Tables 6-1 and 6-2)

A modified ethylenic copolymer rubber (F) was produced in the following manner. Ground product of an ethylene-propylene copolymer rubber having a rubber average molecular weight of 55000 and an ethylene content of 47% by weight was modified by the same method as that used for producing MS-EPM-1 in Examples 1 to 5, to obtain a modified ethylene-propylene copolymer rubber having an amount of maleic anhydride added of 1.2% by weight, an amount of styrene added of 0.7% by weight and a Mooney viscosity ($ML_{1+4}$, 121° C.) of 40.

This modified ethylene-propylene copolymer rubber is hereinafter abbreviated as MS-EPM-2.

The same starting materials as in Example 17 were blended in the proportions shown in Table 6-1, except that MS-EPM-2 was used as modified ethylene-propylene copolymer rubber. Using the resulting blend, a thermoplastic resin composition was produced in the same manner as in Examples 1 to 5, and its physical properties were evaluated. The evaluation results are shown in Table 6-2.

Although satisfactory physical properties were obtained in Example 17 of the present invention in which MS-EPM-1 was used as modified ethylene-propylene copolymer rubber, employment of MS-EPM-2 brought about desirable effects on the low-temperature Izod impact strength and the low-temperature penetration impact strength.

Examples 19 and 20 (Tables 7-1 and 7-2)

A polyethylene terephthalate (Petra® 130, mfd. by Allied Chemical Co., Ltd.) was used as saturated polyester resin (D). This starting polyethylene terephthalate is hereinafter abbreviated as PET-1.

The same stating materials as in Example 18 were blended in the proportions shown in Table 7-1, except that PET-1 alone or a mixture of PET-1 and PBT-1 was used as saturated polyester resin. Using the resulting blends, thermoplastic resin compositions were produced in the same manner as in Example 18 except for changing the resin temperature to 270° C. Test pieces were made of each thermoplastic resin composition by injection molding in the same manner as in Example 18 except for changing the molding temperature to 270° C., and subjected to evaluation of the physical properties. The evaluation results are shown in Table 7-2.

Although satisfactory physical properties were attained in Example 18 of the present invention in which PBT was used alone, the employment of PET-1 alone or a mixture of PET-1 and PBT-11 resulted in a rise of the thermal deformation temperature and hence improvement of heat resistance.

Examples 21 and 22 (Tables 8-1 and 8-2)

An epoxy group containing copolymer (E) was produced in the following manner In the same manner as described in Examples 1 to 5, except that methyl acrylate was used as comonomer in place of vinyl acetate, there was produced by high-pressure radical polymerization a terpolymer of ethylene, methyl acrylate and glycidyl methacrylate in the ratio of 64:14:22 by weight which had a high glycidyl methacrylate content and melt flow rate of 21 g/10 min (190° C., load 2.16 kg). Said epoxy group containing copolymer was hereinafter abbreviated as E.MA.GMA-1.

The same starting materials as in Example 18 were blended in the proportions shown in Table 8-1, except that E.MA.GMA-1 was used as epoxy group containing copolymer. Using the blends thus obtained, thermoplastic resin compositions were produced in the same manner as in Examples 1 to 5, and their physical properties were evaluated. The evaluation results are shown in Table 8-2.

The physical properties were satisfactory as in Example 18.

Examples 23 to 25 (Tables 9-1 and 9-2)

The same materials as in Examples 1 to 5 were blended, except that the starting propylene homopolymer for MS-PP-1 (hereinafter abbreviated as PP-1) was used as polypylene (B). As shown in Table 9-1, the blending proportions of PBT-1, E.VA.GMA-1 and MS-EPM-1 were unvaried, while those of MS-PP-1 and PP-1 were various. Using the blends thus obtained, thermoplastic resin compositions were produced in the same manner as in Examples 1 to 5, and their physical properties were evaluated.

The results of the evaluation are shown in Table 9-2. It can be seen that in Examples 23 to 25 of the present invention, the Izod impact strength and the penetration impact strength were greatly improved as compared with Example 6 in which the modified ethylenepropylene copolymer rubber (F) MS-EPM-1 was not blended.

Example 26 (Tables 10-1 and 10-2)

A thermoplastic resin composition was produced in the same manner as in Example 3, except that in place of MS-PP-1 and MS-EPM-1, a co-modified product of the starting propylene for MS-PP-1 and the starting ethylene propylene copolymer rubber for MS-EPM-1 were used. In a Henschel mixer, with 100 parts by weight of a blend of powder of the starting polypropylene for MS-PP-1 and pellets of the starting ethylene-propylene copolymer rubber for MS-EPM-1 in the ratio of 55:15 were uniformly mixed 1.5 parts b weight of maleic anhydride, 0.5 part by weight of styrene, 0.6 parts by weight of the propylene homopolymer containing as free-radical initiator 8% by weight of 1,3-bis(t-butylperoxyisopropyl)benzene (Sanperox®-Tyl.3, mfd. by Sanken Kako co., Ltd.) supported thereon, and 0.1 part by weight of Irganox® 1010 (mfd. by Ciba Geigy Ltd.). The resulting mixture was melt-kneaded by means of a TEX 44 SS-30BW-2V the twin screw extruder mfd by JAPAN STEEL WORKS, LTD., at a temperature of 220° C for an average residence time of 1.5 minutes to obtain a (maleic anhydride-styrene)co-modified polypropylene (A)/ethylene-propylene copolymer rubber (F) having an amount of maleic anhydride added of 0.20% by weight, an amount of styrene added of 0.18% by weight and a melt flow rate of 7 g/10 min. This co-modified product is abbreviated as MS-(PP-1/EPM-1).

A thermoplastic resin composition was produced in the same manner as in Example 3, except that the co-modified product MS-(PP-1/EPM-1) was used as shown in Table 10-1. Its physical properties was evaluated. The evaluation results are shown in Table 10-2.

Also when the co-modified product MS-(PP-1/EPM-1) was used, the Izod impact strength and the penetration impact strength were satisfactory as in Example 3 in which the modified products MS-PP-1 and MS-EPM-1 obtained by the individual modifications were used.

Example 27 (Tables 11-1 and 11-2)

Co-modification with maleic anhydride and styrene was carried out in the same manner as in Example 26, except that powder of the starting polypropylene for MS-PP-2 and pellets of the starting ethylene-propylene copolymer rubber for MS-EPM-1 were mixed in the ratio of 30/15 by weight. Thus, there was obtained (maleic anhydride-styrene)-co-modified polypropylene (A)/ethylene-propylene copolymer rubber (F) having an amount of maleic anhydride added of 0.30% by weight, an amount of styrene added of 0.27% by weight and a melt flow rate of 4 g/10 min. Said co-modified product is hereinafter abbreviated as MS-(PP-2/EPM-1).

The same materials as in Example 26 were blended in the proportions shown in Table 11-1, except that MS-(PP-2/EPM-1) was used as co-modified product. Using the resulting blend, a thermoplastic resin composition was produced in the same manner as in Examples 1 to 5, and its physical properties were evaluated. The evaluation results are shown in Table 11-2. It can be seen that in Example 27 of the present invention, the Izod impact strength and the low-temeprature penetration impact strength were markedly improved as compared with Examples 6 and 7 in which no modified ethylene-propylene copolymer rubber was blended. Moreover, in Example 27, the thermal deformation temperature and Rockwell hardness were higher and the heat resistance and the scratch resistance were characteristic, as compared with Examples 5 and 17.

Examples 28 to 31 (Table 12)

Molded parts for automobile, a bumper and a fender, were molded out of each of the thermoplastic resin compositions of Example 26 and Example 6 by injection molding. The molded products and test pieces cut out of the molded products were subjected to evaluation of the falling weight impact strength, pendulum impact strength (pendulum test), and initial degree of adhesion of coating layer. The evaluation results are shown in table 12.

In Examples 28 and 29, the molded products, both bumpers and fenders, had a high falling weight impact strength and showed the ductile fracture.

The thermoplastic resin composition of Example 28 was up to the standard in the pendulum test.

Examples 32 to 35 (Tables 13-1 ad 13-2)

Powder of the starting propylene for MS-PP-2 was modified by the same method as that used for producing M-PP-1, to obtain a modified polypropylene having a grafted maleic anhydride content of 0.08% by weight and a melt flow rate of 36 g/10 min. This modified polypropylene is hereinafter abbreviated as M-PP-1.

Glass short fiber of chopped strand Microglass® RES03X-TP10532 mfd. by Nihon Glass Fiber Co., Ltd. was used as filler (H). Said glass short fiber is hereinafter abbreviated as GF-1.

MS-PP-2, M-PP-2, PBT-1, E.MA.GMA-1, MS-EPM-2 and GF-1 were used as stating materials.

Examples 32 to 34 were conducted by employing, as shown in Table 13-1, unvaried proportions of MS-EPM-1, PBT-1 and E.MA.GMA-1 and various proportions of GF-1.

The components other than GF-1 were blended in the proportions shown in Table 13-1, fed through the first feed opening, and previously melt-kneaded. The constituent GF-1 was fed through the second feed opening, and a thermoplastic resin composition was produced under the predetermined kneading conditions. Test pieces were made of each of the thus obtained thermoplastic resin compositions under the predetermined injection molding conditions and subjected to evaluation of the physical properties by the protdetermined evaluation methods.

In Example 35, as shown in Table 13-1, blending was conducted in the same proportions as in Example 6 except that as modified polypropylene, M-PP-2 was used in place of M-PP-1. Using the resulting blend, a thermoplastic resin composition was produced in the same manne as in Example 6, and its physical properties were evaluated.

The evalution results are shown in Table 13-2.

In Examples 32 to 34 of the present invention in which GF-1 was used as filler, the Izod impact strength and the peneetration impact strength were a little lower but the flexural modulus and the thermal deformation temperature were much higher, as compared with Example 21 in which GF-1 was not blended. Furthemore, in Exampls 32 to 34, marked improving effects on the Izod impact strength and the thermal deformation temperature were brought about as compared with Example 35 in which M-PP-2 was used but neither MS-PP-2 nor GF-1 was blended.

As described above, both comparison indicate that in Example 32 to 34,desirable effects on the stiffness and the heat resistance could be obtained.

Example 36 (Tables 14–1 and 14–2)

A thermoplastic resin composition was produced in the same manner as in Example 33, except that in place of MS-PP-2 and MS-EPM-2, a co-modified product of the starting polypropylene for MS-PP-2 and the starting ethylene-propylene copolyemr for MS-EPM-2 was used. Co-modification with maleic anhydride and styrene was conducted in the same manenr as in Example 26, except that powder of the starting polypropylene for MS-PP-2 and ground product of the starting ethylene-propylene copolymer rubber for MS-EPM-2 were mixed in the ratio of 50/23. Thus, there was obtained a (maleic anhyhydride-styrene)-co-modified polypropylene (A)/ethylene-propylene copolymer rubber (F) having an amount of maleic anhydride added of 0.23% by weight, an amount of styrene added of 0.20% by weight, and a melt flow rate of 9 g/10 min. This co-modified product is hereinafter abbreviated as MS-(PP-2/EPM-2).

A thermoplastic resin composition was produced in the same manner as in Example 33, except that the co-modified product MS-(PP-2/EPM-2) was used in place of MS-PP-2 and MS-EPM-2, as shown in Table 14-1. Its physical properties were evaluated. The evaluation results are shown in Table 14-2.

When the modified product MS-(PP-2/EPM-2) was used, particularly desirable effects on the stiffness and the heat resistance could be obtained and the impact properties were satisfactory, as in Example 33 in which the modified products MS-PP-2 and MS-EPM-2 obtained by the individual modifications were used.

Examples 37 to 40 (Table 15)

Molded parts for automobile, a bumper and a fender, were molded out of each of the thefrmoplastic resin compositions of Example 36 and Example 35 by injection molding. The molded products and test pieces cut out of the molded products were subjected to evaluation of the falling weight impact strength, pendulum impact strength (pendulum test), and initial degree of adhesion of coating layer.

The evaluation resujlts are shown in Table 15.

In Examples 37 and 38, the falling weight impact strength was high.

The thermoplastic resin composition of Example 37 was up to the standard in the pendulum test.

The tehermoplastic resin composition according to the present invention is not only good in molding processability but also markedly effective in that it can give molded products much superior in physical properties to those obtained from individual poloymers constituting the thermoplastic resin composition.

The novel thermoplastic resin composition provided by the present nvention can easily be processed into a molded product, a film, a sheet or the like by a molding method usually used for molding thermoplastic resins, for example, injection molding, extrusion molding or the like, giving a product which has a very gopod balance among stiffness, heat resistance, impact resistance, scratch resistance, coating properties, oil resistance, chemical resistance, water resistance, etc., and is ecellent in appearance uniforming and smoothness. It can be advantageously used for a purpose requiring especially high heat resitance and impact resiwtance, in particular, low-temeprature impact resistance.

Example 41 (Tables 16-1 and 16-2)

As the polypropylene (B), a starting highly crystalline propylene block copolymer (hereinafter referred to as PP-3) was prepared according to the slurry polymerization process disclosed in JP-A-60-228504 and used. The block copolymer had the following properties:

| | |
|---|---|
| Melt flow rate: | 7.5 g/10 min, |
| Intrinsic viscosity in tetralin at 135° C.: | 2.18 dl/g, |
| Content of polypropylene homopolymer portion, the first segment produced in the first polymerization step (hereinafter referred to as the P portion): | 84% by weight, |
| Content of ethylene-propylene copolymer portion, the second segment produced in the second polymerization step (hereinafter referred to as the EP portion): | 16% by weight, |
| Intrinsic viscosity of the P portion in tetralin at 135° C. | 1.60 dl/g, |
| 20° C. Cold xylene soluble of the P portion: | 1.6% by weight, |
| Boiling heptane soluble of the P portion: | 4.6% by weight, |
| Isotactic pentad of the boiling heptane insoluble of the P portion: | 0.975, |
| Intrinsic viscosity of the EP portion in tetralin at 135° C.: | 5.2 dl/g, and |
| Weight ratio of ethylene/propylene in the EP portion: | 37/63. |

The copolymer was modified in the following manner:

With a Henschel mixer were uniformly mixed 100 parts by weight of a mixture containing powder of the starting polypropylene of MS-PP-2 and a ground product of the starting ethylene-propylene copolymer rubber of MS-EPM-2 in a weight ratio of 40.6/17.4, 0.5 part by weight of maleic anhydride, 0.5 part by weight of styrene, 0.5 part by weight of a propylene homopolymer supporting 8% by weight of 1,3-bis(t-butylperoxyisopropyl)benzene (Sanperox ® -TY1.3 manufactured by Sanken Kako Co., Ltd.) as a free-radical initiator supported thereon and 0.1 part by weight of Irganox ® 1010 (manufactured by Ciba-Geigy Ltd.). Thereafter the resulting mixture was melt-kneaded with a twin screw type extruder (TEX 44 SS-30BW-2V manufactured by Japan Steel Works, Ltd.) at a kneading temperature of 220° C for 1.5 minutes for the average residense time to obtain a (maleic anhydride-styrene)-co-modified polypropylene (A)/ethylene-propylene copolymer rubber (F) having an amount of maleic anhydride added of 0.11% by weight, an amount of styrene added of 0.07% by weight and a melt flow rate of 7.1 g/10 min (hereinafter referred to as the MS-(PP-2/EPM-2)-2).

Then a thermoplastic resin composition was prepared according to Examples 1 through 5 with compounding the constituents as shown in Table 16-1, wherein PBT-1 and E.MA.GMA-1 were used as the saturated polyester resin (D) and the epoxy group containing copolymer (E), respectively. The physical properties of the obtained thermoplastic resin compositions were evaluated accordingly.

Table 16-2 shows the results. The results demonstrate that using a propylene block copolymer as the polypropylene (B) remarkably improves the fluidity of the thermoplastic resin composition without damaging the physical properties. Thus, the results were fully satisfactory.

Examples 42 and 43 (Tables 17-1 and 17-2)

The same procedure as in Example 26 was repeated, wherein the mixture containing powder of the starting polypropylene of MS-PP-1 and pellets of the starting ethylene propylene copolymer rubber of MS-EPM-1 in a weight ratio of 55/15 was replaced by a mixture containing powder of the starting polypropylene of MS-PP-2 and pellets of the starting ethylene-propylene copolymer rubber of MS-EPM-1 in a weight ratio of 55/23. The procedure gave a (maleic anhydride-styrene)-co-modified polypropylene (A)/ethylene-propylene copolymer rubber (F) having an amount of maleic anhydride added of 0.25% by weight, an amount of styrene added of 0.24% by weight and a melt flow rate of 6 g/10 min (hereinafter referred to as the MS-(PP-2/EPM-1)2).

The above-mentioned procedure was repeated with replacing the pellets of starting ethylene-propylene copolymer rubber by pellets of an ethylene-butene-1 copolymer rubber having a number average molecular weight of 50,000 and an ethylene content of 82% by weight. Thus was obtained a (maleic anhydride-strene)-co-modified polypropylene (A)/ethylene-butene-1 copolymer rubber (F) having an amount of maleic anhydride added of 0.24% by weight, an amount of styrene added of 0.24% by weight, a melt flow rate of 8 g/10 min (hereinafter referred to as the MS-(PP-2/EBM-1)).

Then thermoplastic resin compositions were prepared according to Examples 1 through 5 with compounding the constituents as shown in Table 17-1, wherein PBT-1 and E.MA.GMA-1 were used as the saturated polyester resin (D) and the epoxy group containing copolymer (E), respectively. The physical properties of the obtained thermoplastic resin compositions were evaluated accordingly.

Table 17-2 shows the results. They exhibit excellent properties. The thermoplastic resin composition of Example 43 obtained by using the ethylenebutene-1 copolymer rubber has an advantage that it exhibits a higher Rockwell hardness than the thermoplastic resin composition of Example 42. In other words, the former has a higher scratch resistance than the latter.

TABLE 1

| Constituent Thermoplastic resin comp. No. | Modified polypropylene (A) MS-PP-1 | Saturated polyester resin (D) PBT-1 | Epoxy group containing copolymer (E) E.VA.GMA-1 | Modified ethylenic copolymer rubber (F) MS-EPM-1 | Modified polypropylene M-PP-1 |
|---|---|---|---|---|---|
| Example 1 | 70 | 5 | 10 | 15 | — |
| Example 2 | 65 | 10 | 10 | 15 | — |
| Example 3 | 55 | 20 | 10 | 15 | — |
| Example 4 | 45 | 30 | 10 | 15 | — |
| Example 5 | 40 | 35 | 10 | 15 | — |
| Example 6 | — | 20 | 10 | — | 70 |

TABLE 1-continued

| | | | | | |
|---|---|---|---|---|---|
| Example 7 | — | 30 | 10 | — | 60 |

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 1 | 0.924 | 1.2 | 204 | >200 | 8,190 | 252 |
| Example 2 | 0.938 | 1.2 | 203 | >200 | 8,110 | 252 |
| Example 3 | 0.971 | 0.5 | 198 | >200 | 8,490 | 250 |
| Example 4 | 1.006 | 0.1 | 220 | 52 | 8,490 | 279 |
| Example 5 | 1.023 | 0.1 | 230 | 102 | 8,640 | 289 |
| Example 6 | 0.985 | 15.0 | 272 | >200 | 15,000 | 404 |
| Example 7 | 1.010 | 10.0 | 302 | >200 | 16,000 | 452 |

| Physical properties Thermoplastic resin comp. No. | Izod impact strength (kg · cm/cm) | | Penetration impact strength (YE/TE)*1 (J: joule) | | Thermal deformation temp. (°C.) | Rockwell hardness $H_R$ |
|---|---|---|---|---|---|---|
| | 23° C. | −30° C. | 23° C. | −30° C. | | |
| Example 1 | 74.8 | 4.6 | 27/50 (D) | 0.3/0.3 (B) | 97 | 68 |
| Example 2 | 76.9 | 4.8 | 28/50 (D) | 0.3/0.3 (B) | 96 | 67 |
| Example 3 | 82.7 | 7.4 | 28/50 (D) | 0.2/0.2 (B) | 93 | 66 |
| Example 4 | 15.3 | 6.2 | 21/31 (B) | 0.2/0.2 (B) | 93 | 66 |
| Example 5 | 14.2 | 6.5 | 16/29 (B) | 0.2/0.2 (B) | 93 | 69 |
| Example 6 | 5.1 | 3.1 | 17/26 (B) | 0.1/0.1 (B) | 122 | 95 |
| Example 7 | 5.9 | 3.3 | 15/21 (B) | 0.1/0.1 (B) | 132 | 96 |

Note:
*1Penetration impact strength, YE denotes yield point energy, TE denotes total energy, (D) and (B) indicate the states of fracture: (D): ductile fracture, (B): brittle fracture, (D~B): intermediate fracture state between (B) and (D)

TABLE 2

| Constituent Thermoplastic resin comp. No. | Modified polypropylene (A) MS-PP-1 | Saturated polyester resin (D) PBT-1 | Epoxy group containing copolymer (E) E.VA.GMA-1 | Modified ethylenic copolymer rubber (F) MS-EPM-1 |
|---|---|---|---|---|
| Example 8 | 49 | 20 | 10 | 21 |
| Example 9* | 52 | 20 | 10 | 18 |
| Example 10 | 60 | 20 | 10 | 10 |
| Example 11 | 65 | 20 | 10 | 5 |

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 8 | 0.966 | 0.4 | 181 | >200 | 7,090 | 209 |
| Example 9 | 0.971 | 0.5 | 185 | >200 | 8,090 | 223 |
| Example 10 | 0.975 | 0.8 | 223 | >200 | 10,170 | 283 |
| Example 11 | 0.978 | 1.3 | 253 | >200 | 11,100 | 326 |

| Physical properties Thermoplastic resin comp. No. | Izod impact strength (kg · cm/cm) | | Penetration impact strength (YE/TE)*1 (J: joule) | | Thermal deformation temp. (°C.) | Rockwell hardness $H_R$ |
|---|---|---|---|---|---|---|
| | 23° C. | −30° C. | 23° C. | −30° C. | | |
| Example 8 | 82.7 | 16.3 | 29/49 (D) | 19/31 (B) | 80 | 47 |
| Example 9 | 78.2 | 13.7 | 27/47 (D) | 15/23 (B) | 86 | 55 |
| Example 10 | 19.9 | 6.3 | 28/42 (D~B) | 0.2/0.2 (B) | 100 | 68 |
| Example 11 | 15.0 | 5.0 | 29/39 (D~B) | 0.2/0.2 (B) | 108 | 75 |

Note:
*1penetration impact strength, YE denotes yield point energy, TE denotes total energy, (D) and (B) indicate the states of fracture: (D): ductile fracture, (B): brittle fracture.

TABLE 3

| Constituent Thermoplastic resin comp. No. | Modified polypropylene (A) MS-PP-1 | Saturated polyester resin (D) PBT-1 | Epoxy group containing copolymer (E) E.VA.GMA-1 | Modified ethylenic copolymer rubber (F) MS-EPM-1 |
|---|---|---|---|---|
| Example 12 | 49 | 20 | 5 | 26 |
| Example 13 | 49 | 20 | 2 | 29 |
| Example 14 | 49 | 20 | 1 | 30 |
| Example 15 | 49 | 20 | — | 31 |

| Physical properties Thermoplastic | | Melt flow | Tensile properties | | Flexural properties | |
|---|---|---|---|---|---|---|
| | | | Strength at | Elongation | Modulus of | |

TABLE 3-continued

| resin comp. No. | Specific gravity | rate (g/10 min) | yield (kg/cm²) | at break (%) | elasticity (kg/cm²) | Strength (kg/cm²) |
|---|---|---|---|---|---|---|
| Example 12 | 0.961 | 0.8 | 170 | >200 | 7,650 | 219 |
| Example 13 | 0.958 | 1.3 | 161 | >200 | 7,260 | 220 |
| Example 14 | 0.958 | 2.1 | 162 | >200 | 7,490 | 225 |
| Example 15 | 0.958 | 4.8 | 153 | 130 | 7,720 | 218 |

| Physical properties Thermoplastic resin comp. No. | Izod impact strength 23° C. (kg·cm/cm) | Izod impact strength −30° C. (kg·cm/cm) | Penetration impact strength (YE/TE)*¹ 23° C. (J: joule) | Penetration impact strength (YE/TE)*¹ −30° C. (J: joule) | Thermal deformation temp. (°C.) | Rockwell hardness H_R |
|---|---|---|---|---|---|---|
| Example 12 | 84.0 | 10.0 | 29/48 (D) | 19/32 (B) | 81 | 48 |
| Example 13 | 78.6 | 8.4 | 29/42 (D~B) | 19/30 (B) | 76 | 46 |
| Example 14 | 73.1 | 7.5 | 28/40 (D~B) | 15/24 (B) | 84 | 46 |
| Example 15 | 47.2 | 5.7 | 22/30 (B) | 14/18 (B) | 81 | 46 |

Note:
*¹Penetration impact strength, YE denotes yield point energy, TE denotes total energy, (D) and (B) indicate the states of fracture: (D): ductile fracture, (B): brittle fracture.

TABLE 4

| Constituent Thermoplastic resin comp. No. | Modified polypropylene (A) MS-PP-1 | Saturated polyester resin (D) PBT-1 | Epoxy group containing copolymer (E) E.VA.GMA-1 | Modified ethylenic copolymer rubber (F) MS-EPM-1 | Basic compound (G) Sumicure ® BD |
|---|---|---|---|---|---|
| Example 13 | 55 | 20 | 10 | 15 | 0.5 |

| Physical properties Thermoplastic resin comp. No. | Specific gravity | Melt Flow rate (g/10 min) | Tensile properties Strength at yield (kg/cm²) | Tensile properties Elongation at break (%) | Flexural properties Modulus of elasticity (kg/cm²) | Flexural properties Strength (kg/cm²) |
|---|---|---|---|---|---|---|
| Example 13 | 0.971 | 0.2 | 210 | >200 | 8,570 | 260 |

| Physical properties Thermoplastic resin comp. No. | Izod impact strength 23° C. (kg·cm/cm) | Izod impact strength −30° C. (kg·cm/cm) | Penetration impact strength (YE/TE)*¹ 23° C. (J: joule) | Penetration impact strength (YE/TE)*¹ −30° C. (J: joule) | Thermal deformation temp. (°C.) | Rockwell hardness H_R |
|---|---|---|---|---|---|---|
| Example 13 | 83.4 | 9.3 | 29/49 (D) | 0.3/0.3 (B) | 98 | 72 |

Note:
*¹Penetration impact strength, YE denotes yield point energy, TE denotes total energy, (D) and (B) indicate the states of fracture: (D): ductile fracture, (B): brittle fracture.

TABLE 5

| Constituent Thermoplastic resin comp. No. | Modified polypropylene (A) MS-PP-2 | Saturated polyester resin (D) PBT-1 | Epoxy Group containing copolymer (E) E.VA.GMA-1 | Modified ethylenic copolymer rubber (F) MS-EPM-1 |
|---|---|---|---|---|
| Example 17 | 55 | 20 | 10 | 15 |

| Physical properties Thermoplastic resin comp. No. | Specific gravity | Melt flow rate (g/10 min) | Tensile properties Strength at yield (kg/cm²) | Tensile properties Elongation at break (%) | Flexural properties Modulus of elasticity (kg/cm²) | Flexural properties Strength (kg/cm²) |
|---|---|---|---|---|---|---|
| Example 17 | 0.971 | 0.6 | 219 | >200 | 9,590 | 292 |

| Physical properties Thermoplastic resin comp. No. | Izod impact strength 23° C. (kg·cm/cm) | Izod impact strength −30° C. (kg·cm/cm) | Penetration impact strength (YE/TE)*¹ 23° C. (J: joule) | Penetration impact strength (YE/TE)*¹ −30° C. (J: joule) | Thermal deformation temp. (°C.) | Rockwell hardness H_R |
|---|---|---|---|---|---|---|
| Example 17 | 83.0 | 7.5 | 29/49 (D) | 0.3/0.3 (B) | 99 | 70 |

Note:
*¹Penetration impact strength, YE denotes yield point energy, TE denotes total energy, (D) and (B) indicate the states of fracture: (D): ductile fracture, (B): brittle fracture.

TABLE 6

| Thermoplastic resin comp. | Constituent Modified polypropylene (A) | Constituent Saturated polyester resin (D) | Constituent Epoxy group containing copolymer (E) | Constituent Modified ethylenic copolymer rubber (F) |
|---|---|---|---|---|

TABLE 6-continued

| No. | MS-PP-2 | PBT-1 | E.VA.GMA-1 | MS-EPM-2 |
|---|---|---|---|---|
| Example 18 | 55 | 20 | 10 | 15 |

| Thermoplastic resin comp. No. | Physical properties | | | | | |
|---|---|---|---|---|---|---|
| | Tensile properties | | | | Flexural properties | |
| | Specific gravity | Melt flow rate (g/10 min) | Strength at yield (kg/cm$^2$) | Elongation at break (%) | Modulus of elasticity (kg/cm$^2$) | Strength (kg/cm$^2$) |
| Example 18 | 0.968 | 0.4 | 196 | >200 | 8,300 | 245 |

| Thermoplastic resin comp. No. | Physical properties | | | | | |
|---|---|---|---|---|---|---|
| | Izod impact strength | | Penetration impact strength (YE/TE)*[1] | | Thermal deformation temp. (°C.) | Rockwell hardness H$_R$ |
| | 23° C. (kg · cm/cm) | −30° C. | 23° C. (J: joule) | −30° C. | | |
| Example 18 | 82.4 | 9.0 | 28/49 (D) | 0.4/0.4 (B) | 92 | 58 |

Note:
*[1]Penetration impact strength, YE denotes yield point energy, TE denotes total energy, (D) and (B) indicate the states of fracture: (D): ductile fracture, (B): brittle fracture.

TABLE 7

| Thermoplastic resin comp. No. | Constituent | | | | |
|---|---|---|---|---|---|
| | Modified polypropylene (A) MS-PP-1 | Saturated polyester resin (D) PBT-1 | Saturated polyester resin (D) PET-1 | Epoxy group containing copolymer (E) E.VA.GMA-1 | Modified ethylenic copolymer rubber (F) MS-EPM-2 |
| Example 19 | 55 | 10 | 10 | 10 | 15 |
| Example 20 | 55 | — | 20 | 10 | 15 |

| Thermoplastic resin comp. No. | Physical properties | | | | | |
|---|---|---|---|---|---|---|
| | Tensile properties | | | | Flexural properties | |
| | Specific gravity | Melt flow rate (g/10 min) | Strength at yield (kg/cm$^2$) | Elongation at break (%) | Modulus of elasticity (kg/cm$^2$) | Strength (kg/cm$^2$) |
| Example 19 | 0.973 | 0.4 | 212 | >200 | 9,940 | 276 |
| Example 20 | 0.978 | 0.4 | 228 | >200 | 11,590 | 307 |

| Thermoplastic resin comp. No. | Physical properties | | | | | |
|---|---|---|---|---|---|---|
| | Izod impact strength | | Penetration impact strength (YE/TE)*[1] | | Thermal deformation temp. (°C.) | Rockwell hardness H$_R$ |
| | 23° C. (kg · cm/cm) | −30° C. | 23° C. (J: joule) | −30° C. | | |
| Example 19 | 36.9 | 7.2 | 29/41 (D∼B) | 0.3/0.3 (B) | 108 | 63 |
| Example 20 | 31.3 | 5.4 | 26/34 (B) | 0.2/0.2 (B) | 123 | 67 |

Note:
*[1]Penetration impact strength, YE denotes yield point energy, TE denotes total energy, (D) and (B) indicate the states of fracture: (D): ductile fracture, (B): brittle fracture.

TABLE 8

| Thermoplastic resin comp. No. | Constituent | | | |
|---|---|---|---|---|
| | Modified polypropylene (A) MS-PP-2 | Saturated polyester resin (D) PBT-1 | Epoxy group containing copolymer (E) E.VA.GMA-1 | Modified ethylenic copolymer rubber (F) MS-EPM-2 |
| Example 21 | 55 | 20 | 2 | 23 |
| Example 22 | 55 | 20 | 10 | 15 |

| Thermoplastic resin comp. No. | Physical properties | | | | | |
|---|---|---|---|---|---|---|
| | Tensile properties | | | | Flexural properties | |
| | Specific gravity | Melt flow rate (g/10 min) | Strength at yield (kg/cm$^2$) | Elongation at break (%) | Modulus of elasticity (kg/cm$^2$) | Strength (kg/cm$^2$) |
| Example 21 | 0.968 | 0.7 | 193 | >200 | 9,180 | 263 |
| Example 22 | 0.968 | 0.7 | 198 | >200 | 7,300 | 216 |

| Thermoplastic resin comp. No. | Physical properties | | | | | |
|---|---|---|---|---|---|---|
| | Izod impact strength | | Penetration impact strength (YE/TE)*[1] | | Thermal deformation temp. (°C.) | Rockwell hardness H$_R$ |
| | 23° C. (kg · cm/cm) | −30° C. | 23° C. (J: joule) | −30° C. | | |
| Example 21 | 82.7 | 9.2 | 29/49 (D) | 0.4/0.4 (B) | 100 | 57 |

TABLE 8-continued

| | | | | | | |
|---|---|---|---|---|---|---|
| Example 22 | 79.1 | 6.9 | 28/48 | 0.3/0.3 (B) | 89 | 58 |

Note:
*1 Penetration impact strength, YE denotes yield point energy, TE denotes total energy, (D) and (B) indicate the states of fracture: (D): ductile fracture, (B): brittle fracture.

TABLE 9

| Thermo-plastic resin comp. No. | Constituent | | | | | Physical properties | | Tensile properties | |
|---|---|---|---|---|---|---|---|---|---|
| | Modified polypropylene (A) MS-PP-1 | Polypropylene (B) PP-1 | Saturated polyester resin (D) PBT-1 | Epoxy group containing copolymer (E) E.VA.GMA-1 | Modified ethylenic copolymer rubber (F) MS-EPM-1 | Specific gravity | Melt flow rate (g/10 min) | Strength at yield (kg/cm²) | Elongation at break (%) |
| Example 23 | 50 | 5 | 20 | 10 | 15 | 0.971 | 0.5 | 197 | >200 |
| Example 24 | 22.5 | 22.5 | 20 | 10 | 15 | 0.971 | 0.5 | 201 | >200 |
| Example 25 | 5 | 50 | 20 | 10 | 15 | 0.971 | 0.5 | 204 | >200 |

| Thermo-plastic resin comp. No. | Flexural properties | | Izod impact strength | | Penetration impact strength (YE/TE)*1 | | Thermal deformation temp. (°C.) | Rockwell hardness $H_R$ |
|---|---|---|---|---|---|---|---|---|
| | Modulus of elasticity (kg/cm²) | Strength (kg/cm²) | 23° C. | −30° C. (kg · cm/cm) | 23° C. | −30° C. (J: joule) | | |
| Example 23 | 8,420 | 247 | 82.4 | 7.2 | 29/49 (D) | 0.2/0.2 (B) | 92 | 65 |
| Example 24 | 8,100 | 233 | 81.1 | 6.4 | 28/47 (D) | 0.2/0.2 (B) | 87 | 63 |
| Example 25 | 7,780 | 220 | 79.7 | 5.7 | 26/45 (D∼B) | 0.2/0.2 (B) | 82 | 60 |

Note:
*1 Penetration impact strength, YE denotes yield point energy, TE denotes total energy, (D) and (B) indicate the states of fracture: (D): ductile fracture, (B): brittle fracture.

TABLE 10

| Thermo-plastic resin comp. No. | Constituent | | | Physical properties | | Tensile properties | |
|---|---|---|---|---|---|---|---|
| | Co-modified [polypropylene (A)/ ethylenic copolymer rubber (F)] MS-(PP-1/EPM-1) | Saturated polyester resin (D) PBT-1 | Epoxy group containing copolymer (E) E.VA.GMA-1 | Specific gravity | Melt flow rate (g/10 min) | Strength at yield (kg/cm²) | Elongation at break (%) |
| Example 26 | 70 | 20 | 10 | 0.971 | 0.6 | 195 | >200 |

| Thermo-plastic resin comp. No. | Flexural properties | | Izod impact strength | | Penetration impact strength (YE/TE)*1 | | Thermal deformation temp. (°C.) | Rockwell hardness $H_R$ |
|---|---|---|---|---|---|---|---|---|
| | Modulus of elasticity (kg/cm²) | Strength (kg/cm²) | 23° C. | −30° C. (kg · cm/cm) | 23° C. | −30° C. (J: joule) | | |
| Example 26 | 8,110 | 230 | 82.7 | 15.6 | 29/49 (D) | 26/44 (D∼B) | 86 | 64 |

Note:
*1 Penetration impact strength, YE denotes yield point energy, TE denotes total energy, (D) and (B) indicate the states of fracture: (D): ductile fracture, (B): brittle fracture.

TABLE 11

| Thermo-plastic resin comp. No. | Constituent | | | Physical properties | | Tensile properties | |
|---|---|---|---|---|---|---|---|
| | Co-modified [polypropylene (A)/ ethylenic copolymer rubber (F)] MS-(PP-2/EPM-1) | Saturated polyester resin (D) PBT-1 | Epoxy group containing copolymer (E) E.VA.GMA-1 | Specific gravity | Melt flow rate (g/10 min) | Strength at yield (kg/cm²) | Elongation at break (%) |
| Example 27 | 45 | 45 | 10 | 1.060 | 0.6 | 264 | 88 |

| Thermo-plastic resin comp. No. | Flexural properties | | Izod impact strength | | Penetration impact strength (YE/TE)*1 | | Thermal deformation temp. (°C.) | Rockwell hardness $H_R$ |
|---|---|---|---|---|---|---|---|---|
| | Modulus of elasticity (kg/cm²) | Strength (kg/cm²) | 23° C. | −30° C. (kg · cm/cm) | 23° C. | −30° C. (J: joule) | | |
| Example 27 | 12,000 | 374 | 14.3 | 7.7 | 13/13 (B) | 1.2/1.3 | 113 | 87 |

Note:
*1 Penetration impact strength, YE denotes yield point energy, TE denotes total energy, (D) and (B) indicate the states of fracture: (D): ductile fracture, (B): brittle fracture.

TABLE 12

| | Thermoplastic resin composition | Molded product | Falling weight impact strength*1 (kg cm) | Pendulum test | Initial degree of adhesion of coating layer (%) |
|---|---|---|---|---|---|
| Example 28 | Thermoplastic resin composition of Example 26 | Bumper | 300 (D) | Good No crack, no deformation | 100 |
| Example 29 | Thermoplastic resin composition of Example 26 | Fender | 300 (D) | — | 100 |

TABLE 12-continued

| | Thermoplastic resin composition | Molded product | Falling weight impact strength[*1] (kg cm) | Pendulum test | Initial degree of adhesion of coating layer (%) |
|---|---|---|---|---|---|
| Example 30 | Thermoplastic resin composition of Example 6 | Bumper | <10 (B) | Bad Cracked at the corners | 90 |
| Example 31 | Thermoplastic resin composition of Example 6 | Fender | <10 (B) | — | 90 |

Note:
[*1] (D) and (B) indicate the states of fracture: (D): ductile fracture, (B): brittle fracture.

TABLE 13

| Thermoplastic resin comp. No. | Modified polypropylene (A) MS-PP-2 | Saturated polyester resin (D) PBT-1 | Epoxy group containing copolymer (E) E.MA.GMA-1 | Epoxy group containing copolymer (E) E.VA.GMA-1 | Modified ethylenic copolymer rubber (F) MS-EPM-2 | Filler (H) GF-1 | Modified polypropylene M-PP-2 | Specific gravity | Melt flow rate (g/10 min) |
|---|---|---|---|---|---|---|---|---|---|
| Example 32 | 53 | 20 | 2 | — | 23 | 2 | — | 0.979 | 0.6 |
| Example 33 | 50 | 20 | 2 | — | 23 | 5 | — | 1.007 | 0.4 |
| Example 34 | 45 | 20 | 2 | — | 23 | 10 | — | 1.035 | 0.1 |
| Example 35 | — | 20 | — | 10 | — | — | 70 | 0.985 | 15.0 |

| Thermoplastic resin comp. No. | Tensile properties Strength at yield (kg/cm²) | Tensile properties Elongation at break (%) | Flexural properties Modulus of elasticity (kg/cm²) | Flexural properties Strength (kg/cm²) | Izod impact strength 23° C. (kg · cm/cm) | Izod impact strength −30° C. | Penetration impact strength (YE/TE)[*1] 23° C. (J: joule) | Penetration impact strength (YE/TE)[*1] −30° C. | Thermal deformation temp. (°C.) | Rockwell hardness $H_R$ |
|---|---|---|---|---|---|---|---|---|---|---|
| Example 32 | 249 | 19 | 12,290 | 338 | 43.9 | 5.7 | 18/27 (B) | 0.2/0.2 (B) | 128 | 64 |
| Example 33 | 278 | 14 | 13,860 | 362 | 28.4 | 5.2 | 15/19 (B) | 0.1/0.1 (B) | 136 | 66 |
| Example 34 | 364 | 9 | 16,510 | 441 | 28.1 | 6.6 | 9/12 (B) | 0.1/0.1 (B) | 141 | 79 |
| Example 35 | 302 | >200 | 16,400 | 457 | 5.1 | 3.1 | 17/26 (D~B) | 0.1/0.1 (B) | 130 | 99 |

Note:
[*1] Penetration impact strength, YE denotes yield point energy, TE denotes total energy, (D) and (B) indicate the states of fracture: (D): ductile fracture, (B): brittle fracture.

TABLE 14

| Thermoplastic resin comp. No. | Co-modified [polypropylene (A)/ ethylenic copolymer rubber (F)] MS-(PP-2/EPM-2) | Saturated polyester resin (D) PBT-1 | Epoxy group containing copolymer (E) E.MA.GMA-1 | Filler (H) GF-1 |
|---|---|---|---|---|
| Example 36 | 73 | 20 | 2 | 5 |

| Thermoplastic resin comp. No. | Specific gravity | Melt flow rate (g/10 min) | Tensile properties Strength at yield (kg/cm²) | Tensile properties Elongation at break (%) | Flexural properties Modulus of elasticity (kg/cm²) | Flexural properties Strength (kg/cm²) |
|---|---|---|---|---|---|---|
| Example 36 | 1.007 | 0.3 | 265 | 18 | 12,730 | 339 |

| Thermoplastic resin comp. No. | Izod impact strength 23° C. (kg · cm/cm) | Izod impact strength −30° C. | Penetration impact strength (YE/TE)[*1] 23° C. (J: joule) | Penetration impact strength (YE/TE)[*1] −30° C. | Thermal deformation temp. (°C.) | Rockwell hardness $H_R$ |
|---|---|---|---|---|---|---|
| Example 36 | 30.5 | 10.9 | 15/19 (B) | 7.1/13 (B) | 151 | 69 |

Note:
[*1] Penetration impact strength, YE denotes yield point energy, TE denotes total energy, (D) and (B) indicate the states of fracture: (D): ductile fracture, (B): brittle fracture.

TABLE 15

| | Thermoplastic resin composition | Molded product | Falling[*1] weight impact strength (kg cm) | Pendulum test | Initial degree of adhesion of coating layer (%) |
|---|---|---|---|---|---|
| Example 37 | Thermoplastic resin composition of Example 36 | Bumper | 120 (B) | Good | 100 |
| Example 38 | Thermoplastic resin composition | Fender | 120 (B) | — | 100 |

TABLE 15-continued

| | Thermoplastic resin composition | Molded product | Falling*1 weight impact strength (kg cm) | Pendulum test | Initial degree of adhesion of coating layer (%) |
|---|---|---|---|---|---|
| | of Example 36 | | | | |
| Example 39 | Thermoplastic resin composition of Example 35 | Bumper | <10 (B) | Bad | 90 |
| Example 40 | Thermoplastic resin composition of Example 35 | Fender | <10 (B) | — | 90 |

*1(D) and (B) indicate the states of fracture:
(D): ductile fracture, (B) brittle fracture.

TABLE 16

| Thermoplastic resin comp. No. | Constituent | | | | |
|---|---|---|---|---|---|
| | Co-modified [polypropylene (A)/ ethylenic copolymer rubber (F)] MS-(PP-2/EPM-2)-2 | Saturated polyester resin (D) PBT-1 | Epoxy group containing copolymer (E) E.MA.GMA-1 | Polypropylene (B) PP-3 | |
| Example 41 | 58 | 5 | 2 | 35 | |

| Thermoplastic resin comp. No. | Physical properties | | | | |
|---|---|---|---|---|---|
| | Specific gravity | Melt flow rate (g/ 10 min) | Tensile properties | | Flexural properties |
| | | | Strength at yield (kg/cm$^2$) | Elongation at break (%) | Modulus of elasticity (kg/cm$^2$) | Strength (kg/cm$^2$) |
| Example 41 | 0.919 | 3.6 | 197 | >200 | 10,200 | 256 |

| Thermoplastic resin comp. No. | Physical properties | | | | |
|---|---|---|---|---|---|
| | Izod impact strength 23° C.   −30° C. (kg · cm/cm) | | Penetration impact Strength (YE/TE)*1 23° C.   −30° C. (J:joule) | | Thermal deformation temp. (°C.) | Rockwell hardness H$_R$ |
| Example 41 | 81.0 | 11.2 | 29/49 (D) | 29/53 (D) | 103 | 68 |

Note:
*1Penetration impact strength, YE denotes yield point energy, TE denotes total energy, (D) and (B) indicate the states of fracture: (D): ductile fracture, (B): brittle fracture.

TABLE 17

| Thermoplastic resin comp. No. | Constituent | | | |
|---|---|---|---|---|
| | Co-modified [polypropylene (A)/ ethylenic copolymer rubber (F)] MS-(PP-2/EPM-1)-2 | Saturated polyester resin (D) PBT-1 | Epoxy group containing copolymer (E) E.MA.GMA-1 | Co-modified [polypropylene (A)/ ethylenic copolymer rubber (F)] MS-(PP-2/EPM-1) |
| Example 42 | 78 | 20 | 2 | — |
| Example 43 | — | 20 | 2 | 78 |

| Physical properties Thermoplastic resin comp. No. | Physical properties | | | | | |
|---|---|---|---|---|---|---|
| | Specific gravity | Melt flow rate (g/ 10 min) | Tensile properties | | Flexural properties | |
| | | | Strength at yield (kg/cm$^2$) | Elongation at break (%) | Modulus of elasticity (kg/cm$^2$) | Strength (kg/cm$^2$) |
| Example 42 | 0.968 | 1.5 | 208 | >200 | 9,200 | 263 |
| Example 43 | 0.968 | 1.2 | 215 | >200 | 8,900 | 263 |

| Thermoplastic resin comp. No. | Physical properties | | | | Thermal | |
|---|---|---|---|---|---|---|
| | Izod impact strength 23° C.   −30° C. (kg · cm/cm) | | Penetration impact strength (YE/TE)*1 23° C.   −30° C. (J: joule) | | Thermal deformation temp. (°C.) | Rockwell hardness H$_R$ |
| Example 42 | 84.0 | 9.8 | 28/47 (D) | 28/44 (D~B) | 96 | 71 |
| Example 43 | 84.0 | 7.0 | 28/45 (D) | 28/45 (D~B) | 94 | 74 |

Note:
*1Penetration impact strength, YE denotes yield point energy, TE denotes total energy, (D) and (B) indicate the states of fracture: (D): ductile fracture, (B): brittle fracture.

What is claimed is:

1. A thermoplastic resin composition consisting essentially of (1) 100 parts by weight of at least one resin composition comprising (i) 1 to 99% by weight of a crystalline polypropylene resin (C) selected from the group consisting of
  (a) a modified polypropylene (A) obtained by graft copolymerizing onto a polypropylene (B) 0.01 to 10 parts by weight of an unsaturated carboxylic acid or the anhydride thereof and 0.01 to 10 parts by weight of an unsaturated aromatic monomer per 100 parts by weight the polypropylene (B), and
  (b) a composition comprising 5% by weight or more, based on the resin composition (1), of a modified polypropylene (A) and a polypropylene (B), and
(ii) 99 to 1% by weight of at least one saturated polyester resin (D) comprising diol components and dicarboxylic acid components, at least 40 mole% of which are terephthalic acid,
(2) 0.1 to 300 parts by weight of an epoxy group-containing polymer (E) which is selected from the group consisting of
  (i) a copolymer of 99.9 to 50% by weight of ethylene and 0.1 to 50% by weight of at least one unsaturated epoxy compound selected from the group consisting of
    (a) glycidyl acrylate,
    (b) glycidyl methacrylate,
    (c) glycidyl itaconate,
    (d) allyl glycidyl ether,
    (e) 2-methylallyl glycidyl ether and
    (f) p-styryl glycidyl ether,
  (ii) a copolymer of 99.9 to 50% by weight of ethylene, 0.1 to 50% by weight of the unsaturated epoxy compound as defined above and at least one ethylenically unsaturated compound selected from the group consisting of
    (a) vinyl acetate,
    (b) methyl acrylate,
    (c) ethyl acrylate,
    (d) methyl methacrylate,
    (e) vinyl chloride,
    (f) vinylidene chloride, and
    (g) isobutyl vinyl ether, and
  (iii) a mixture of the copolymers (i) and (ii),
(3) 0.01 to 300 parts by weight of a modified ethylenic copolymer rubber (F) obtained by graft copolymerizing onto an ethylenic copolymer rubber 0.5 to 15 parts by weight of an unsaturated carboxylic acid or the anhydride thereof and 0.2 to 20 parts by weight of an unsaturated aromatic monomer per 100 parts by weight of the ethylenic copolymer rubber, wherein the ethylenic copolymer rubber is at least one member selected from the group consisting of
  (i) an ethylene-alpha-olefin copolymer rubber which is a copolymer of 15 to 85% by weight of ethylene and 15 to 85% by weight of an alpha-olefin and
  (ii) an ethylene-alpha-olefin-nonconjugated diene coppolymer rubber which is a terpolymer of 15 to 85% by weight of ethylene, 15 to 85% by weight of an alpha-olefin and 3% by weight or less of a nonconjugated diene, and
(4) up to 5 parts by weight of a basic compound (G) optionally added as a reaction accelerator,
said ipolypropylene (B) being at least one crystalline polypropylene selected from the group consisting of
  (i) crystalline propylene homopolymer,
  (ii) crystalline propylene random copolymer which is a copolymer of propylene and at least one other alphaolefin, and
  (iii) crystalline propylene block copolymer which comprises (a) a first segment containing a crystalline propylene homopolymer or crystalline propylene random copolymer of propylene and 6 mole% or less of at least one other alpha-olefin and (b) a second segment containing a random copolymer of 10 mole% or more of ethylene and at least one other alpha-olefin,
said unsaturated carboxylic acid or the anhydride thereof being selected from the group consisting of
  (i) acrylic acid,
  (ii) methacrylic acid,
  (iii) maleic acid,
  (iv) itaconic acid,
  (v) maleic anhydride, and
  (vi) itaconic anhydride,
said unsaturated aromatic monomer being selected from the group consisting of
  (i) styrene,
  (ii) o-methylstyrene,
  (iii) p-methylstyrene,
  (iv) m-methylstyrene,
  (v) alpha-methylstyrene and
  (vi) vinyltoluene,
the content of the saturated polyester resin (D) in said thermoplastic resin composition being less than 50% by weight.

2. A thermoplastic resin composition according to claim 1, which further comprises 0.01 to 300 parts by weight per 100 parts by weight of the resin composition of a filler (H).

3. A thermoplastic resin composition according to claim 1, wherein in the modified polypropylene (A), the unsaturated carboxylic acid or the anhydride thereof to be graft copolymerized is maleic anhydride, and the unsaturated aromatic monomer is styrene.

4. A thermoplastic resin composition according to claim 2, wherein in the modified polypropylene (A), the unsaturated carboxylic acid or the anhydride thereof to be graft copolymerized is maleic anhydride and the unsaturated aromatic monomer is styrene.

5. A thermoplastic resin composition according to claim 1, wherein the saturated polyester resin (D) is at least one member selected from the group consisting of polyethylene terephthalate and polybutylene terephthalate.

6. A thermoplastic resin composition according to claim 2, wherein the saturated polyester resin (D) is at least one member selected from the group consisting of polyethylene terephthalate and polybutylene terephthalate.

7. A thermoplastic resin composition according to claim 1, wherein in the modified ethylenic copolymer rubber (F), the unsaturated carboxylic acid or the anhydride thereof to be graft copolymerized is maleic anhydride and the unsaturated aromatic monomer is styrene.

8. A thermoplastic resin composition according to claim 2, wherein in the modified ethylenic copolymer rubber (F), the unsaturated carboxylic acid or the anhydride thereof to be graft copolymerized is maleic anhydride anthydride and the unsaturated aromatic monomer is styrene.

9. A thermoplastic resin composition according to claim 1, wherein in the modified ethylenic copolymer rubber (F), the ethylenic copolymer rubber is at least one member selected from the group consisting of
- (i) an ethylene-alpha-olefin copolymer rubber which is a copolymer of 15 to 85% by weight of ethylene and 15 to 85% by weight of ether propylene or butene-1, and
- (ii) an ethylene-alpha-olefin-nonconjugated diene copolymer rubber which is a terpolymer of 15 to 85% by weight of ethylene, 15 to 85% by weight of either propylene or butene-1, and 3% by weight or less of a nonconjugated diene.

10. A thermoplastic resin composition according to claim 2, wherein in the modified ethylenic copolymer rubber (F), the ethylenic copolymer rubber is at least one member selected from the group consisting of
- (i) an ethylene-alpha-olefin copolymer rubber which is a copolymer of 15 to 85% by weight of ethylene and 15 to 85% by weight of either propylene or butene-1, and
- (ii) an ethylene-alpha-olefin-nonconjugated diene copolymer rubber which is a terpolymer of 15 to 85% by weight of ethylene, 15 to 85% by weight of either propylene or butene-1, and 3% by weight or less of a nonconjugated diene.

11. A thermoplastic resin composition according to claim 1, wherein the basic compound (I) is at least one organic amine compound selected from the group consisting of benzyldimethylamine and 2,4,6-tris(dimethylaminomethyl)phenol.

12. A thermoplastic resin composition according to claim 2, wherein the basic compound (I) is at least one organic benzyldimethylamine and 2,4,6-tris(dimethylaminomethyl)phenol.

13. A thermoplastic resin composition according to claim 2, wherein the filler (H) is at least one inorganic filler selected from the group consisting of glass fiber, potassium titanate whisker, talc, mica and calcium carbonate.

14. A molded part for automobiles obtained by molding the thermoplastic resin composition according to claim 1.

15. A molded part for automobiles obtained by molding the thermoplastic resin composition according to claim 2.

16. A molded part for automobiles according to claim 14, wherein the molded part is a bumper.

17. A molded part for automobiles according to claim 15, wherein the molded part is a bumper.

18. A molded part for automobiles according to claim 14, wherein the molded part is a fender.

19. A molded part for automobiles according to claim 15, wherein the molded part is a fender.

* * * * *